(12) United States Patent
Thakore et al.

(10) Patent No.: US 11,455,163 B2
(45) Date of Patent: Sep. 27, 2022

(54) SYSTEMS AND METHODS FOR PREPARING AND DEPLOYING CROSS-PLATFORM APPLICATIONS

(71) Applicant: Hammer of the Gods Inc., Palo Alto, CA (US)

(72) Inventors: Kartik Thakore, Santa Clara, CA (US); Srivatsa Akshay Sharma, Santa Clara, CA (US); Walter Adolf De Brouwer, Los Altos Hills, CA (US); Geert Trooskens, Meise (BE); Meelis Lootus, London (GB); Sam Leroux, Ghent (BE); Holly Ly, Santa Clara, CA (US)

(73) Assignee: Hammer of the Gods Inc., Palo Alto, CA (US)

( * ) Notice: Subject to any disclaimer, the term of this patent is extended or adjusted under 35 U.S.C. 154(b) by 0 days.

(21) Appl. No.: 17/523,790

(22) Filed: Nov. 10, 2021

(65) Prior Publication Data
US 2022/0147341 A1    May 12, 2022

Related U.S. Application Data

(60) Provisional application No. 63/112,419, filed on Nov. 11, 2020, provisional application No. 63/112,443, filed on Nov. 11, 2020.

(51) Int. Cl.
*G06F 8/65*     (2018.01)
*G06F 8/41*     (2018.01)
(Continued)

(52) U.S. Cl.
CPC ............... *G06F 8/65* (2013.01); *G06F 8/44* (2013.01); *G06F 9/44589* (2013.01); *G06N 20/00* (2019.01)

(58) Field of Classification Search
CPC .......... G06F 8/65; G06F 8/44; G06F 9/44589; G06N 20/00
See application file for complete search history.

(56) References Cited

U.S. PATENT DOCUMENTS

2014/0189679 A1*  7/2014  Adams ................ G06F 9/44578
                                                    717/174
2017/0060574 A1   3/2017  Malladi et al.
(Continued)

FOREIGN PATENT DOCUMENTS

WO    WO-2021034906 A1 *  2/2021  ............ H04W 24/02

OTHER PUBLICATIONS

"Tensorflow Lite Micro: Embedded Machine Learning on TinyML Systems" David et al., published in Semantic Scholar, Oct. 17, 2020 (Year: 2020).*

(Continued)

*Primary Examiner* — Daxin Wu
(74) *Attorney, Agent, or Firm* — Haynes Beffel & Wolfeld LLP; Ernest J. Beffel, Jr.; Sikander M. Khan

(57) ABSTRACT

The technology disclosed relates to systems and methods for deploying cross-platform applications to tiny ML hardware. The system provides tools to maintain definitions of a first, a second and a third declarative instruction. The system provides tools to maintain compiled bytecode for a procedure block and a tiny ML model that runs on the tiny ML hardware. The compiled bytecode further includes a manifest of one or more capabilities, one or more procedure blocks and at least one output supported by the tiny ML model. The system provides a loader that connects to an instance of the tiny ML hardware. The loader includes logic to verify that the instance of the ML hardware supports the one or more capabilities, the one or more procedure blocks (Continued)

and at least one output specified in the manifest. The loader loads the bytecode and verifies integrity of the load.

20 Claims, 38 Drawing Sheets

(51) Int. Cl.
  *G06F 9/445* (2018.01)
  *G06N 20/00* (2019.01)

(56) References Cited

U.S. PATENT DOCUMENTS

| | | | |
|---|---|---|---|
| 2019/0370687 | A1 | 12/2019 | Pezzillo et al. |
| 2020/0125956 | A1 | 4/2020 | Ravi et al. |
| 2020/0327371 | A1* | 10/2020 | Sharma .............. G06K 9/6257 |
| 2021/0050300 | A1 | 2/2021 | Lin et al. |
| 2021/0133607 | A1* | 5/2021 | Stubbs .................. H04L 67/12 |
| 2021/0248514 | A1* | 8/2021 | Celia ................. G06Q 30/0208 |
| 2022/0012607 | A1 | 1/2022 | Liu et al. |
| 2022/0057519 | A1 | 2/2022 | Goldstein et al. |

OTHER PUBLICATIONS

U.S. Appl. No. 17/523,818—Office Action dated Mar. 29, 2022, 16 pages.

Gegick et al., Build Security In—Least Privilege, Cybersecurity and Infrastructure Security Agency (CISA), published Sep. 14, 2005, 8 pages. Retrieved on Apr. 20, 2022. Retrieved from the internet [URL: https://www.cisa.gov/uscert/osi/articles/knowledge/principles/least-privilege].

Reddi et al., Widening Access to Applied Machine Learning with TinyML, published Jun. 9, 2021, 20 pages.

Ghoting et al., SystemML: Declarative machine learning on MapReduce, IEEE, published 2011, 12 pages.

PCT/US2021/058850—International Search Report and Written Opinion, dated Feb. 23, 2022, 17 pages.

Sanchez-Iborra et al., TinyML-Enabled Frugal Smart Objects: Challenges and Opportunities, IEEE Circuits and Systems Magazine, vol. 20, No. 3, dated Oct. 17, 2020, 15 pages.

* cited by examiner

TinyContainer File for Sine Machine Learning (ML) Model

```
image: TinyOS/base [Instruction #1]   ~~ 551 pipeline:
  rand:
    capability: RAND [Instruction #2]  ⎫
    outputs:                           ⎬ 553
      - type: F32                      ⎪
        dimensions: [1]                ⎭ mod360:
    proc-block: "hotg-ai/rune#proc_blocks/modulo" [Instruction #3] ⎫
    inputs:                                                         ⎪
      - rand                                                        ⎪
    outputs:                                                        ⎬ 555
      - type: F32                                                   ⎪
        dimensions: [1]                                             ⎪
    args:                                                           ⎪
      modulus: 360.0                                                ⎭ sine:
    model: "./sinemodel.tflite"    [Instruction #4]  ⎫
    inputs:                                          ⎪
      - mod360                                       ⎬ 557
    outputs:                                         ⎪
      - type: F32                                    ⎪
        dimensions: [1]                              ⎭ serial:
    out: serial    [Instruction #6]  ~~ 559
    inputs:
      - rand
```

FIG. 5B

TinyContainer File for Sine Machine Learning (ML) Model

```
identity:                                    } 571
  proc-block: "./identity"
  inputs:
    - mod360
    - sine
  outputs:
    - type: F32
      dimensions: [1]
    - type: F32
      dimensions: [1]

debug_output:                                } 575
  out: serial
  inputs:
    - rand                   576
    - identity.0 # mod360         577
    - identity.1 # The sine output   578
```

| Name | Kind | Description |
|---|---|---|
| u8 | Integer | An 8-bit unsigned integer |
| i8 | Integer | An 8-bit signed integer |
| u16 | Integer | A 16-bit unsigned integer |
| i16 | Integer | A 16-bit signed integer |
| u32 | Integer | A 32-bit unsigned integer |
| i32 | Integer | A 32-bit signed integer |
| u64 | Integer | A 64-bit unsigned integer |
| i64 | Integer | A 64-bit signed integer |
| f32 | Float | A 32-bit floating point number |
| f64 | Float | A 64-bit floating point number |
| utf8 | String | An arbitrary-length string constant |

Manifest code for the Example Sine ML model

```
Manifest {
    capabilities: vec![
        CapabilityRequest {
            capability: CAPABILITY::RAND,         ── 703
            params: HashMap<String, String>::new().insert("n", "1")
        }
    ],
    out: OUTPUT::SERIAL,
    models: vec![ml::model (
        name: "sine",
        input_dims: vec![-1,-1],
        output_dims: vec![-1,-1],
        framework: ml::FRAMEWORK::TFLITE
    )]
};
```

FIG. 7

Sine ML Model Example – Request Data from Hardware

```
const pr: ProviderResponse = ProviderResponse{
    inputs: vec![CapabilityResponse{
        capability: CAPABILITY::RAND,
        input: RandCapability.process(manifest.request(CAPABILITY::RAND).params)
    }],
    err: None
};
```

800

Example Capability Types

| Name | Description | Supported Arguments |
|---|---|---|
| ACCEL | Samples from an accelerometer as three "f32" values X, Y, Z | |
| RAND | Random data generated from the runtime's random number generator | |
| RAW | Raw data from a user-specified source | |
| SOUND | 16-bit Pulse Code Modulated Audio Samples | hz – the sample rate in Hertz |
| IMAGE | An image | width - image's width in pixels<br>height - image's height in pixels<br>pixel-format – the format used by the pixels, e.g.,<br>- @PixelFormat::Grayscale<br>- @PixelFormat::RGB<br>- @PixelFormat::BGR |

Acyclic Graph Corresponding to an Example Tiny Container Specification File

Example of a Procedure Block

1000

```
pub struct Processor {
} impl proc_block::ProcBlock for Processor {
    fn process(&self, input_t: TYPE, input: Vec<u8>, params: HashMap<String, String>,
    output_t: TYPE ) -> Vec<u8> { let input: Vec<f64> = tinyContainer_types::marshall(input_t,
        input).as(proc_block::TYPE::f32);

let modulo = match params.get("mod") {
            Some(params: String) => {
                let itr_num: f32 = param.parse().unwrap();
            },
            None => 1
        };

let output: Vec<f32> = input.into_iter()
            .map(move |v|( v % modulo ))

return tinyContainer_types::marshall(proc_block::TYPE::u8,
        output).as(proc_block::TYPE::u8);
    }
}
```

FIG. 10

Example of a Binary File of a Pre-trained ML Model

FIG. 11

Example of using "targets ls" command of TinyDeploy tool to display devices that are available for deployment of TinyContainers

```
$ hmr targets ls
Target                        Type    Name          Avail
---------------------------   -----   -----------   -----
/dev/tty.usbmodem14301        COM     Nano 33 BLE   True
2b99c594-c904-4133            BLE     Nano 33 BLE   False
56c0a255-7c45-44c9            BLE     Nano 33 BLE   False
/dev/tty.usbmodem15103        COM     Nano 33 BLE   False
```

Example of using "targets" API of TinyDeploy tool to display devices that are available for deployment of TinyContainers

GET /api/targets

```
[{
    id: "2376a353-74a9-45fe-bab7-012a6d39ae32",
    name: "arduino-ble-nano33",
    tags: ["factory-floor-b"],
    status: "VALID",
    protocol: "ble",
    logs: "/api/targets/2376a353-74a9-45fe-bab7-
    012a6d39ae32/logs?page=0"
},    ⎫ 1253
{
    id: "76de5c93-5f2a-4b68-bd63-86f1b8a66e0e",
    name: "factory-noise-signal-app",
    tags: ["factory-manager-mobile-app"],
    status: "CONNECTED",
    protocol: "gRPC",
    logs: "/api/targets/76de5c93-5f2a-4b68-bd63-
    86f1b8a66e0e/logs?page=0"
},    ⎫ 1255
]
```

Example Command to deploy a TinyContainer to a Target Device

```
$ hmr targets cast -t 56c0a255-7c45-44c9 ./sine.tinyContainer
Deploying ./sine.TinyContainer to target 56c0a255-7c45-44c9
Verifying provider: 100%| | 12/12 [00:00<00:00, 1941.73it/s]
Provider with fqdn=arduino:mbed:nano33ble found
Uploading rune: 100%| | 3289/3289 [00:01<00:00, 1878.39it/s]
Verifying rune: 100%| | 12/12 [00:00<00:00, 274.49it/s]
Capability: BLE OK: 100%| | 6/6 [00:01<00:00, 3.25it/s]
```

Example API to deploy a TinyContainer to a Target Device

```
PUT tiny-service/api/target --body
{"targets": [ "76de5c93-5f2a-4b68-bd63-86f1b8a66e0e", "factory-
manager-mobile-app"], "container": "./sine.tinycontainer"}

>> RETURNS
{id: "313b033d-3963-4deb-8761-1469aedcf03f"
    targets: [{
        id: "76de5c93-5f2a-4b68-bd63-86f1b8a66e0e"
        status: "DEPROVISING"
    }, {
        tag: "factory-manager-mobile-app",
        status: "STARTING"
    }]
}
```

FIG. 13B

Example Command to Identify Services Running on Hardware Devices

```
$ hmr services ls
Id          Name              Target                         Provider                         Status
--------    --------------    ---------------------------    -----------------------------    ----------
e0118501    service-v0.0.2    /dev/tty.usbmodem14301         fqdn=arduino:mbed:nano33ble      RUNNING
a9dee7ad    cough-v0.0.2      2b99c594-c904-4133             fqdn=arduino:mbed:nano33ble      RUNNING
1ee625a7    service-v0.0.2    2b99c594                       fqdn=arduino:mbed:nano33ble      RESTARTING
```

Example of using "deployments" API of TinyDeploy tool to display devices that are available for deploying TinyContainers

```
GET /api/deployments

It returns an array of objects
[{
  containerId: "5ed07fbd-7a2e-4a69-9c95-955c775badb9",
  targets: [{
    Id: "2376a353-74a9-45fe-bab7-012a6d39ae32",       ⎫
    name: "arduino-ble-nano33-2376a353-factory-floor-a"  ⎬ 1453
  },{                                                  ⎭
    Id: "313b033d-3963-4deb-8761-1469aedcf03f",        ⎫
    name: "coral-ai-313b033d-factory-floor-a-node",    ⎬ 1455
  },{                                                  ⎭
    Id: "76de5c93-5f2a-4b68-bd63-86f1b8a66e0e",        ⎫
    name: "factory-noise-signal-app",                   ⎪
    tags: "factory-manager-mobile-app",                 ⎬ 1457
    logs:                                               ⎪
    "/api/targets/76de5c93-5f2a-4b68-bd63-86f1b8a66e0e/logs?page=0"  ⎭
  }],
}]
```

FIG. 14B

Service Logs Command to Collect Logs from TinyDeploy Services

```
$ hmr services logs a9de07ad
MDL v0.0.1, build Jun 1 2020 02:11:26
TinyContainer a9de07ad
hmr::TinyOS::TinyContainer::callWithArgs Searching for _start
hmr::TinyOS::TinyContainer::callWithArgs calling function
hmr::sensor::PCM Collecting 100 sample(s) from capability AUDIO<PCM>:16hz
Mono Window: 1s
TinyContainer > ProcessingFeature - MFCC
hmr::ml::predict TENSOR[0.16 ... 0.61] Inference: [0.7583333333333]
hmr::sensors::PCM Collecting 100 sample(s) from capability AUDIO<PCM>:16hz
Mono Window: 1s
TinyContainer > ProcessingFeature - MFCC
```

Example API for Service Logs for Hardware Devices

```
GET /api/targets/76de5c93-5f2a-4b68-bd63-86f1b8a66e0e/logs?page=0
{
  {
    "event": "container_executed",
    "deviceid": "76de5c93-5f2a-4b68-bd63-86f1b8a66e0e",
    "tags" : ["factory-manager-mobile-app"],
    "createdAt" : "2021-11-05T00:12:00.073876Z",
    "recordedAt" : "2021-11-05T00:12:01.072426Z"
  },
  {
    "event": "inference_completed",
    "deviceid": "2376a353-74a9-45fe-bab7-012a6d39ae32",
    "tags" : ["factory-floor-b"],
    "createdAt" : "2021-11-07T00:25:00.073876Z",
    "recordedAt" : "2021-11-07T00:25:00.073876Z"
  },
  ...
}
```

FIG. 15B

Example Code to Deploy TinyOS on a Hardware Device

```
include <Arduino.h> include <tinyos/hmr.h>
include <tinyos/rune.h>
include <tinyos/arduino/capability.h> void setup()
{
    // Start SERIAL coms
    Serial.begin(115200);

// Start BLE peripheral with HMR protocol to
    // listen for tinyContainers
    hmr::ble::Begin();

// Initializes capability interfaces hmr::capability::arduino::RAND::init();
    hmr::capability::arduino::AUDIO::init();

} const char* rune_ptr = NULL;

void loop()
{
    if (hmr::tinyOS::GetRune() == NULL) {
        //Waits for Bluetooth, WIFI or Serial delivery of tinyContainer bytecode size_t app_rune_len = 0;

if ( hmr::loader::fetchTinyContainer(rune_ptr, app_rune_len) ) {
            hmr::tinyOS::TinyContainer* tinyContainer =
hmr::tinyOS::SetTinyContainer(app_rune, app_rune_len);
            hmr::tinyOS::GetRune()->InitializeRuntime();
        } else {
            return;
        }
    }
    hmr::tinyOS::task(hmr::runic::GetTinyContainer());
    hmr::tinyOS::GetTinyContainer()->removeRuntime();
    Serial.println("hmr.ino::loop ... Finished task. Starting again.");
}
```

Welcome To the TinyDeply

2700

Search Project | Filter by Date | ⊕ Add New Project

Saved Project List

| Poject Name | Date Added | Poject Type | Actions |
|---|---|---|---|
| My Cool Rune! | Jun 3, 2021 | Image Processing | SDK |
| Blue, White, Red | Sep 5, 2021 | Video Processing | SDK |
| La Comunidad | Jan 9, 2021 | NLP | SDK |
| Sinatra Maker | Jan 9, 2021 | Voice Processing | SDK |
| My Cool Rune! | Jun 3, 2021 | Image Processing | SDK |

TinyDeploy

- Home
- TinyDeploy >
- TinyDeploy Studio
- Your Projects
- Templates List
- Deployed Runes
- Tutorials
- History
- TinyVerse
- Plans

SYSTEMS AND METHODS FOR PREPARING AND DEPLOYING CROSS-PLATFORM APPLICATIONS

PRIORITY APPLICATION

This application claims the benefit of U.S. Patent Application No. 63/112,419, entitled "SYSTEMS AND METHODS FOR PREPARING AND DEPLOYING CROSS-PLATFORM APPLICATIONS," filed Nov. 11, 2020 and claims the benefit of U.S. Patent Application No. 63/112,443, entitled "SYSTEMS AND METHODS FOR PREPARING AND DEPLOYING RESILIENT CROSS-PLATFORM APPLICATIONS," filed Nov. 11, 2020. Both provisional applications are incorporated by reference for all purposes.

FIELD OF THE TECHNOLOGY DISCLOSED

The technology disclosed relates to preparation and deployment of cross-platform programming of tiny machine learning (TinyML) applications. The technology disclosed can also be applied to tiny sensors that perform signal processing without ML.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Edge computing is bringing computation closer to the sources of data. In many instances edge computing devices have limited memory and computational power. Sensors capture a large amount of data that can be processed by edge computing devices connected via the IoT (Internet of Things). However, due to lack of applications for edge devices, the IoT devices collect data and send it back to a central cloud service. Sending all of the data collected by edge devices to a central server may not be feasible due to low bandwidth network connections. Additionally, IoT approach suffers from platform fragmentation, lack of interoperability, and lack of common technical standards. In this situation, the variety of IoT devices, in terms of both hardware variations and differences in software running on them, makes it difficult to develop applications that work consistently between different inconsistent technology ecosystems.

An opportunity arises to develop and deploy cross-platform applications for edge computing devices so that data collected by such devices can be processed locally.

BRIEF DESCRIPTION OF THE DRAWINGS

FIGS. 5B and 5C present a TinyContainer specification file for the Sine ML model example.

FIG. 7 presents an example manifest code for the example Sine ML model.

FIG. 8 presents an example code for requesting capability data from a hardware device and examples of capability types.

FIG. 10 is an example procedure block that can be defined by providers of tiny ML hardware, tiny edge devices, or sensors.

FIG. 11 presents an example binary file of a pre-trained model loaded as bytecode to a tiny ML hardware.

FIGS. 12A & 12B present examples of using the TinyDeploy tool to find devices that are available for deploying TinyContainers.

FIGS. 13A & 13B present examples of using the TinyDeploy tool to deploy a TinyContainer to a target tiny ML hardware device or a tiny edge device.

FIG. 14A presents an example of using the TinyDeploy tool to identify services (or TinyContainer instances) running on tiny ML hardware devices.

FIG. 14B presents an example API for finding TinyContainers available for deployment.

FIG. 15A is an example of using "service logs" command of the TinyDeploy tool to collect logs from a target Tiny ML hardware device.

FIG. 15B presents an example of using an API to collect logs from Tiny ML hardware devices in a deployment.

FIG. 16 is an example code to deploy TinyOS on a Tiny ML hardware device.

FIGS. 22-28 present examples of user interfaces for building, managing and deploying TinyContainers to Tiny ML hardware devices or edge devices.

DETAILED DESCRIPTION

Figure 1A:
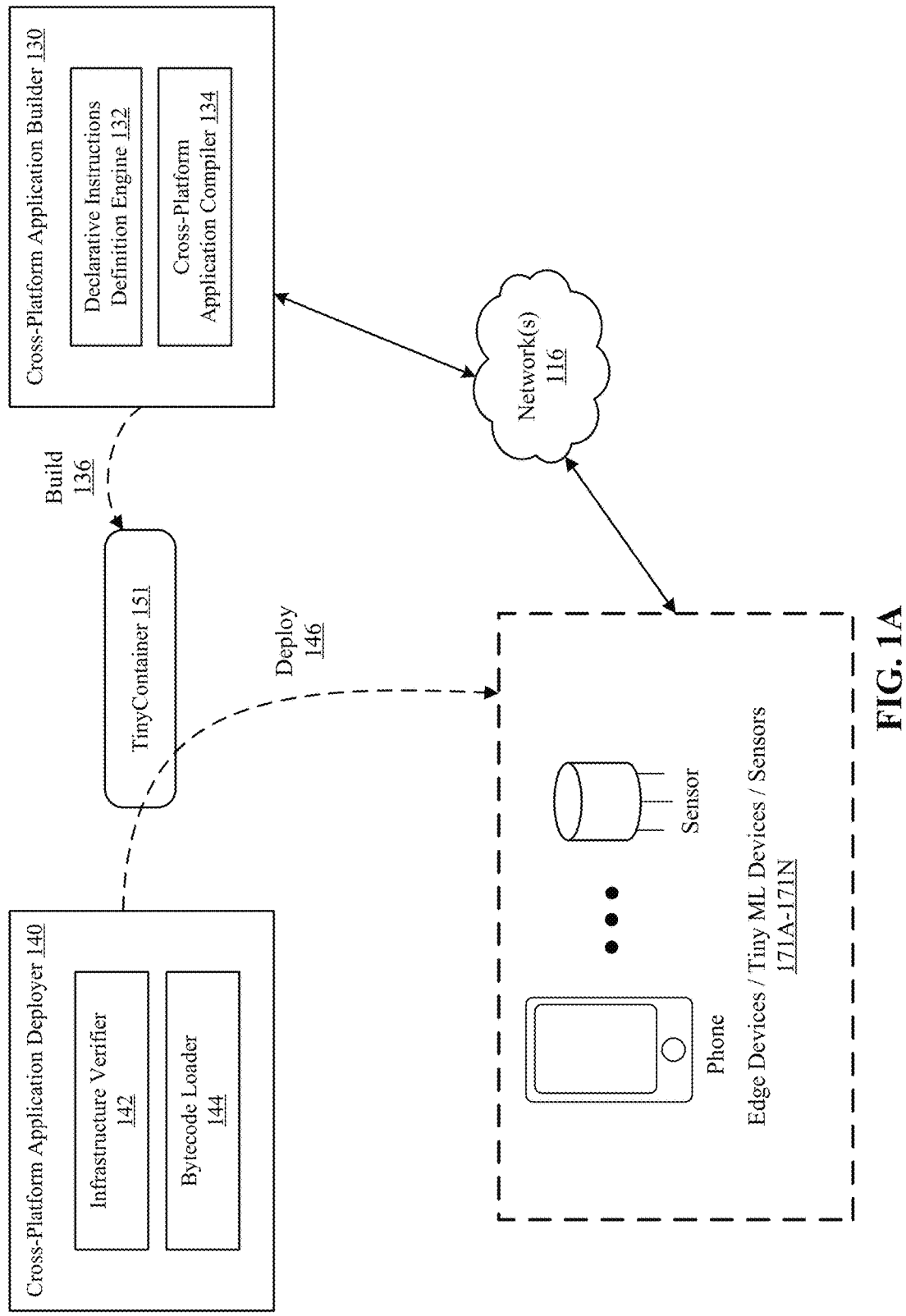
FIG. 1A presents a high-level architecture for building and deploying cross-platform applications.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

Introduction

Providing artificial intelligence (AI) services at tactical speeds is a particular challenge due to latencies involved in transferring high volumes of data to centralized servers for processing. Sensors generate more data than can be captured or used with the number of devices connected via the IoT (Internet of Things). IoT connects devices that either perform operations or collect data that can be connected back to a central cloud service. Applications depend on processing of sensor data in the cloud, which adds complexity, privacy concerns, security overhead, and expense to the total cost of a company or enterprise.

The IoT approach suffers from platform fragmentation, lack of interoperability, and lack of common technical standards. In this situation, the variety of edge devices, in terms of both hardware variations and differences in software running on them, makes it difficult to develop applications that work consistently between different inconsistent technology ecosystems. The IoT's amorphous computing nature is also a problem for security since security patches to bugs found in the core operating system often do not reach users of older devices. Additionally, IoT poses challenges to maintain data privacy as data leaks and other such events are becoming more and more common. The technology disclosed can address above-mentioned data privacy concerns by providing applications that can be deployed on edge device so that data from edge devices may not be transferred to servers or storage systems.

The technology disclosed approaches the problems facing edge devices in the IoT using Tiny Machine Learning (TinyML). In TinyML, algorithms and intelligence are performed at the point of data collection on low power devices. TinyML is a paradigm shift and can run machine learning models on low power devices. Additional advances allow edge GPU/TPU devices to be leveraged directly with sensors. Since less data needs to be sent to cloud services and no data is stored or collected in a central location, the technology disclosed enables privacy, security, and data integrity. Additionally, the complexity of the overall application is reduced. Another advantage of TinyML is the overall power consumption of these applications is much lower.

The technology disclosed can support the growing need for resilient privacy and energy-efficient applications by bringing containerization concepts to edge devices. It enables developers to package ML and application logic as applications or containers called TinyContainers to deploy on edge devices. The technology disclosed addresses IoT fragmented platform issues by providing a common platform for TinyContainers to run on different types of devices. Currently, edge applications need to be compiled and built directly against the device software/hardware. The concept of containerization provided by the technology disclosed is applicable to a variety of edge devices for various applications such as TinyML i.e., running machine learning models on tiny devices or tiny hardware, or local signal processing without ML on tiny sensors, etc. Tiny devices or tiny hardware refers to Low Power devices e.g., Internet of Things (IoT) devices. We refer to these Low Power hardware devices running ML models as TinyML hardware (or TinyML hardware device).

Containerization decouples the application specific code and model from the hardware, device capabilities, sensors, and processing architectures. A TinyContainer is a bytecode that consists of the model and dependencies (libraries and code) required to operate on the edge device. The bytecode operations can be secured for example by signing TinyContainers with X509 certificates or a variety of other signing and checksum approaches. Furthermore, provisioning devices can be configured to load only the required bytecode operations. Sensor access can be made available thus adhering to Least Privilege principles outlined by CISA available at <us-cert.cisa.gov/bsi/articles/knowledge/principles/least-privilege>. TinyContainers can have low-level APIs that can be programmed against a variety of languages (C/C++, Go, Rust, etc.). Common TinyContainers can also be built by third-party developers by providing them a community registry. Having a verified TinyContainer base image ensures that standards are met by approved developers and provides guarantees during testing, development, and deployment.

TinyDeploy is a tool that can be used to deploy TinyContainers over the air via BLE (Bluetooth Low Energy), Serial, WIFI, LoRaWAN and other network connectivity protocols. TinyDeploy tool can deploy TinyContainers on configuration-defined infrastructure with a TinyConfig tool. A TinyConfig tool provides an infrastructure provisioning technology that automates the deployment of TinyContainer applications to supported devices. TinyConfig helps define, provision, and manage complex infrastructure composed of a variety of devices. Finally, TinyDeploy can leverage Raft-like algorithms collectively called TinyMesh. TinyMesh is a self-healing protocol that can use adaptive mesh technologies to ensure TinyContainer applications can be brought back up with minimal downtime. The technology disclosed addresses an emerging need by providing edge computing directly to devices in a safe and secure manner.

We now present details of the technology disclosed by first presenting an environment in which the system can build and deploy TinyContainers.

Environment

Many alternative embodiments of the technology disclosed may be appropriate and are contemplated, including as described in these detailed embodiments, though also including alternatives that may not be expressly shown or described herein but as obvious variants or obviously contemplated according to one of ordinary skill based on reviewing the totality of this disclosure in combination with other available information. For example, it is contemplated that features shown and described with respect to one or more embodiments may also be included in combination with another embodiment even though not expressly shown and described in that specific combination.

For purpose of efficiency, reference numbers may be repeated between figures where they are intended to represent similar features between otherwise varied embodiments, though those features may also incorporate certain differences between embodiments if and to the extent specified as such or otherwise apparent to one of ordinary skill, such as differences clearly shown between them in the respective figures.

We describe a system for building and deploying tiny machine learning applications. The system is described with reference to FIG. 1A showing an architectural level schematic of a system 100 in accordance with an implementation. Because FIG. 1A is an architectural diagram, certain details are intentionally omitted to improve the clarity of the description. The discussion of FIG. 1A is organized as follows. First, the elements of the figure are described, followed by their interconnection. Then, the use of the elements in the system is described in greater detail.

FIG. 1A includes the system 100. This paragraph names labeled parts of system 100. The system includes a cross-platform application builder 130, a cross-platform application deployer 140, a TinyContainer 151, edge devices 171A-171N, and a network(s) 116. The cross-platform application builder 130 includes a declarative instruction definition engine 132, and a cross-platform application compiler 134. The cross-platform application deployer 140 includes an infrastructure verifier 142, and a bytecode loader 144.

The system 100 enables users to build and deploy TinyContainers to various types of edge devices including mobile phones, sensors or other IoT devices that may be used independently or embedded in other systems. A TinyContainer is a bytecode that consists of the model and dependencies (libraries and code) required to operate the model. The cross-platform application builder 130 includes logic to build tiny machine learning applications that can be deployed as TinyContainers to edge devices 171A-171N. The technology disclosed includes logic for containerizing, deploying and running TinyML applications. A TinyContainer decouples machine learning (or ML) application from the underlying hardware on which it is deployed. FIG. 1A shows that the TinyContainer 151 built (136) by the cross-platform application builder 130 can be deployed (146) to one or more edge devices 171A-171N by using cross-platform application deployer 140 (also referred to as TinyDeploy tool).

Figure 1B:
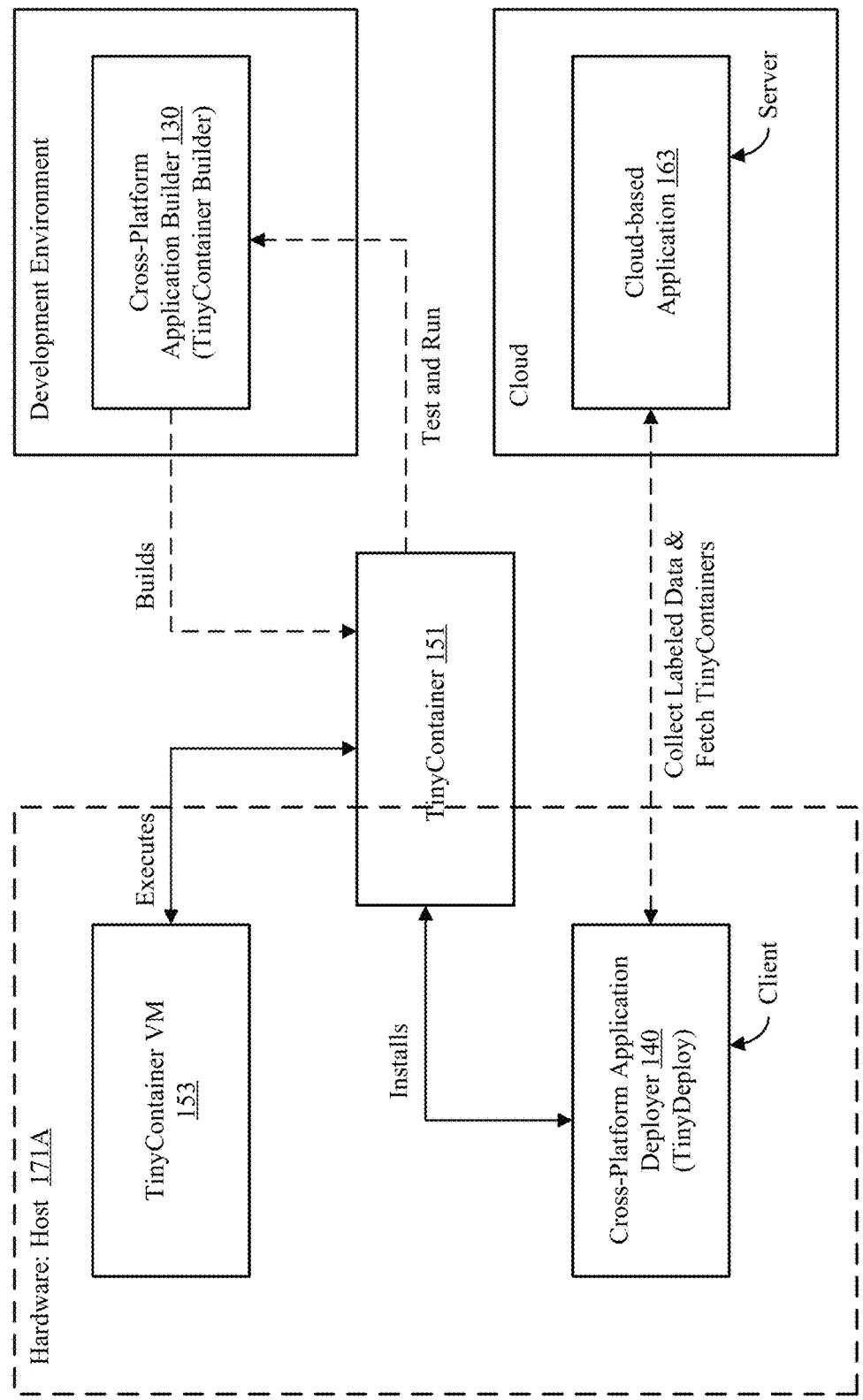
FIG. 1B presents interaction between various system components for building and deploying TinyContainers.

FIG. 1B presents interaction 150 between various elements of the system 100 in more detail. The technology disclosed provides tools to package and run TinyContainer (or TinyML application) in a Virtual Machine (VM) 153 on various types of hardware devices. TinyContainer files are bytecode that can be deployed to various types of hardware devices (or targets) and contain both the ML model and the code required to process signals to generate input features for the ML model. TinyContainers are lightweight and only contain code that is needed to process the data received from the edge device. Users or developers can share their TinyContainers for development, testing and deployments. In one implementation, as shown in FIG. 1B, the TinyContainer-VM 153 and TinyDeploy tool 140 can run on the same host device (or Tiny ML hardware device or edge device) as shown in FIG. 1B. In another implementation, the TinyDeploy tool can connect to a TinyContainer-VM from a remote computing device.

The TinyContainer and the TinyDeploy tool (or cross-platform application deployer 140) can operate in a client-server architecture as shown in FIG. 1B. The TinyContainer Virtual Machine 153 (or TinyContainer VM) runs on a target device and executes and manages the TinyContainer. Additionally, applications 163 developed by third-party developers, deployed on external servers such as cloud-based servers can access the TinyDeploy tool 140 to collect labeled data directly from TinyContainers deployed on host hardware devices. The cloud-based applications can access TinyContainers for which they have authorization for deployment, debugging etc.

The technology disclosed uses a capability-based mechanism to access data provided by the edge hardware device. This mechanism also enables isolation and security of a TinyContainer when deployed on the edge hardware device. A TinyContainer can specify what data to capture from the capability of the hardware device. A capability (also referred to as cross-platform capability) can be a function performed by an edge device such as capturing images, collecting audio samples, collecting temperature, generating a random number, etc. The TinyContainer enables developers and users in the fields of machine learning and data processing to declare how data from capability of hardware is transformed using a high level, declarative language. Instead of writing code that manipulates data or needs to interface with complex third-party libraries for receiving inputs, the users (or developers) can write a TinyContainer file which declares each processing step and defers their implementation to the TinyContainer-VM. The TinyContainer-VM includes logic to interface with the edge devices and can leverage existing third-party libraries for data manipulation.

The cross-platform application builder 130 includes the declarative instructions definitions engine 132 which includes logic to maintain definitions of declarative instructions used in development of TinyContainer applications. There can be at least three types of declarative instructions in a TinyContainer specification file. The declarative instructions definitions engine 132 includes logic to maintain definitions of a first declarative instructions that, when processed, interact with cross-platform capabilities common to multiple tiny ML hardware devices (or tiny ML hardware instances) 171A-171N. The declarative instructions definitions engine 132 includes logic to maintain definitions of a second declarative instructions that, when processed, invoke at least one procedure block (also referred to as ML procedure block) that interacts with the capabilities to produce input to a tiny ML model that runs on the tiny ML hardware. The declarative instructions definitions engine 132 includes logic to maintain definitions of a third declarative instructions that, when processed, cause output from the tiny ML hardware. We explain capabilities, procedure blocks and output instructions via examples of TinyContainer applications in the following section.

The cross-platform application builder 130 also includes the cross-platform application compiler 134 which includes logic to compile procedure blocks and the tiny ML models into bytecode. The compiled bytecode can interact via a virtual machine (VM) layers with at least one capability to produce output responsive to the first, second and third declarative instructions presented above. The compiled bytecode executes on the tiny ML hardware or a tiny ML hardware simulator without recompilation of the bytecode to adapt too alternative instances of the tiny ML hardware, each running its alternative virtual machine (VM) layer.

The TinyContainer 151 can be deployed to hardware devices 171A-171N using cross-platform application deployer (or TinyDeploy) 140. The cross-platform application deployer connects to one or more target hardware devices 171A-171N to deploy TinyContainer 151. The infrastructure verifier 142 verifies presence of TinySupport infrastructure running on the edge devices (such as ML hardware). The infrastructure verifier 142 also verifies availability of the capabilities of the ML hardware, procedure block and output. Upon verification, the bytecode loader 144 loads the bytecode and verifies integrity of the load. A manifest object can be used to negotiate with Tiny ML hardware devices (or edge devices) for the availability of the TinySupport infrastructure including the required capability and the output. We provide examples of the bytecode and manifest when presenting the TinyContainer initialization process.

Completing the description of FIG. 1A, the components of the system 100, described above, are all coupled in communication with the network(s) 116. The actual communication path can be point-to-point over public and/or private networks. The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. The engines or system components of FIG. 1A are implemented by software running on varying types of computing devices. Example devices are a workstation, a server, a computing cluster, a blade server, and a server farm. Additionally, a variety of authorization and authentication techniques, such as username/password, Open Authorization (OAuth), Kerberos, Secured, digital certificates and more, can be used to secure the communications.

Figure 2:
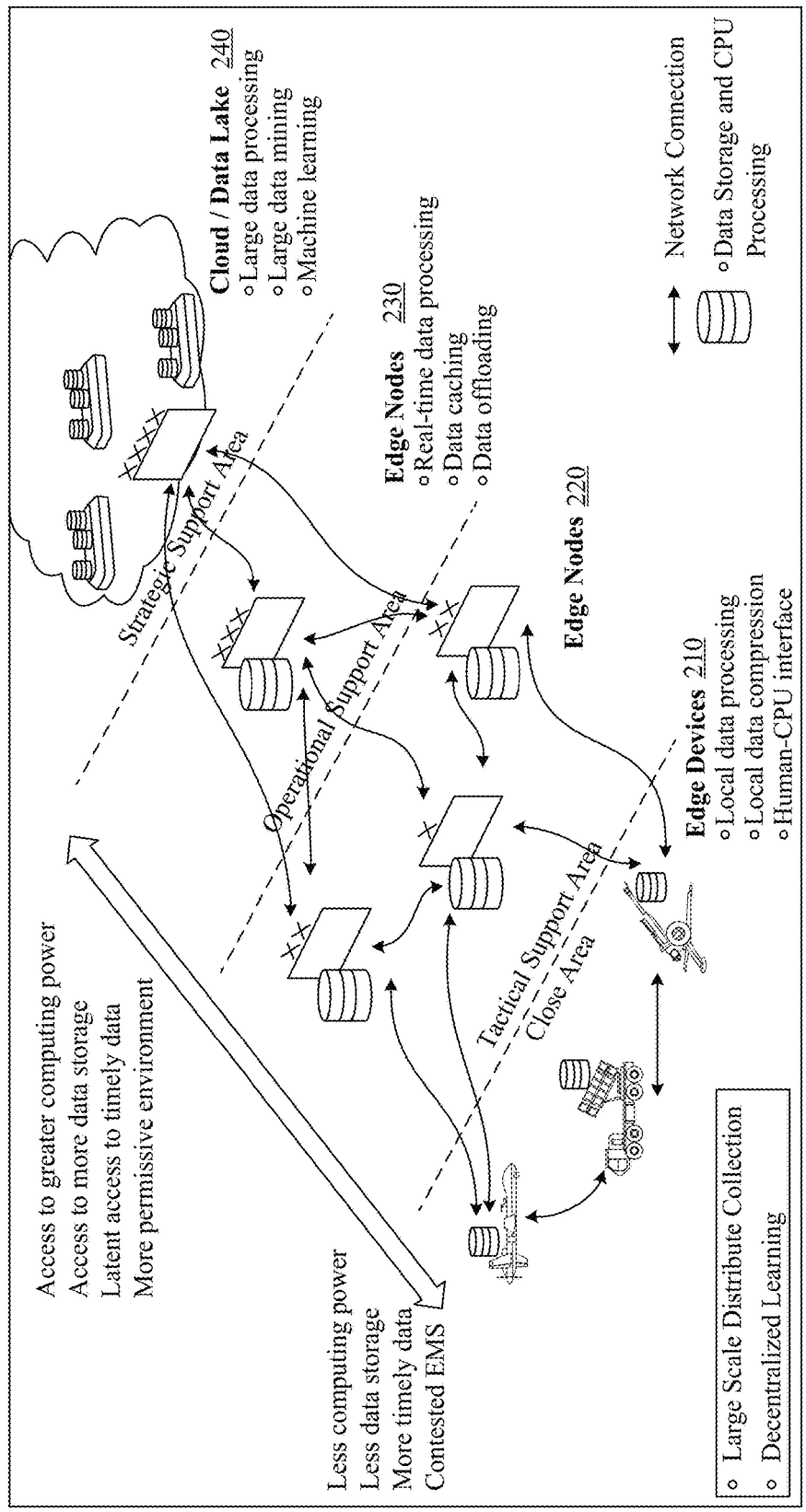
FIG. 2 presents an example framework for edge processing and data transfer.

The technology disclosed can provide an operating model for device manufacturers and application engineers to ensure Least Privileged Principles in close area components (FIG. 2) of the multi-domain framework 200. In the Principle of Least Privilege operating model, devices host only the capabilities that are required for applications to work. For example, the edge devices 210 (in FIG. 2) perform local data processing. The data is aggregated as it moves up in the hierarchy to edge nodes 220, then to edge nodes 230 and finally to cloud storage 240. As we move up in the hierarchy of devices, the computing power of devices increases.

The technology disclosed provides containerization, provisioning, and automated deployments to enable users to build and deploy TinyContainers to tiny ML hardware devices or edge devices. Such devices can have limited computing and storage resources. We now present more details of building and deploying TinyContainers using tools provided by the technology disclosed. We first present details of building TinyContainers, followed by provisioning and deployment of TinyContainers to edge devices.

Containerization

Figure 3:
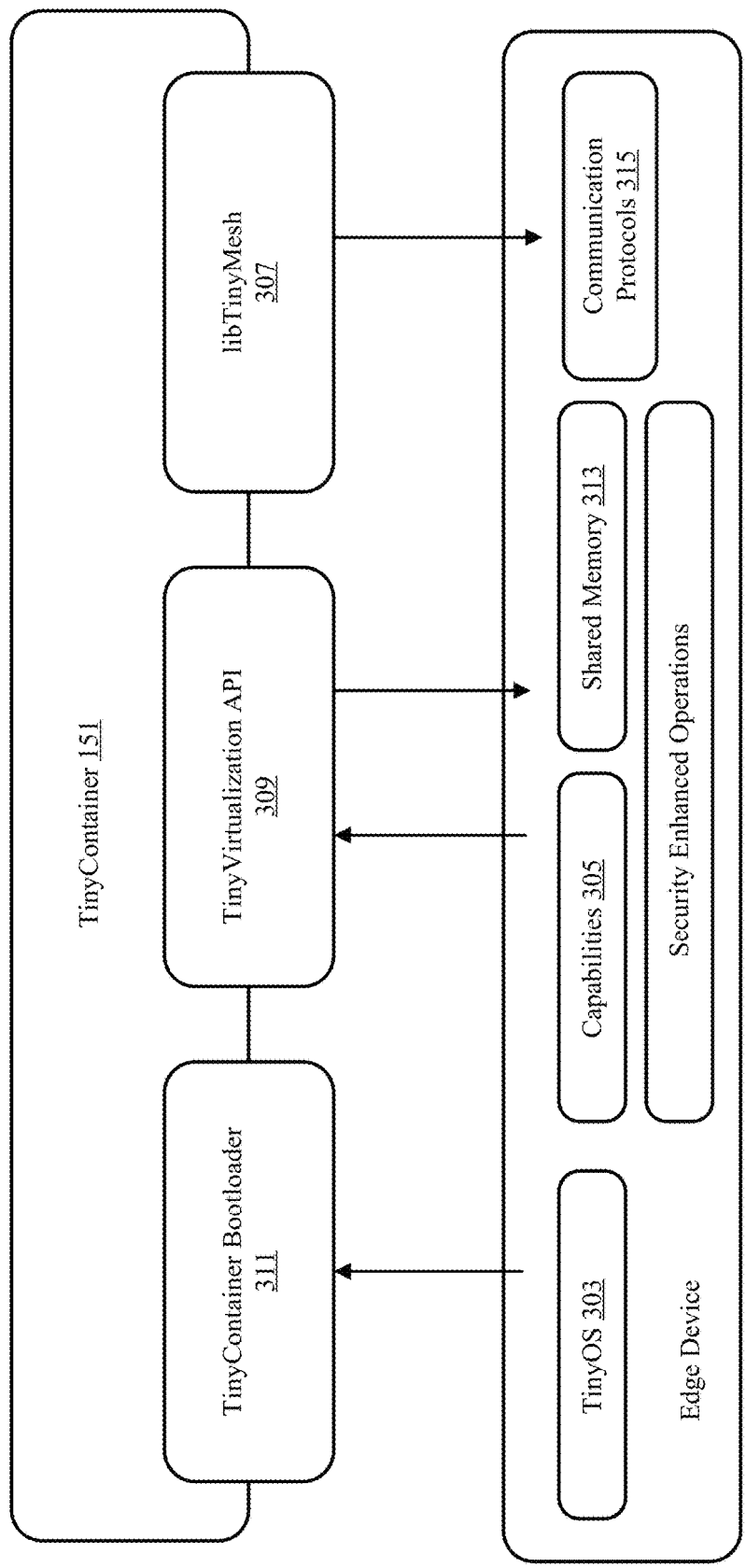
FIG. 3 presents components and interfaces of TinyContainer and TinyOS.

FIG. 3. presents a high-level architecture 300 of deployment of a TinyContainer on an edge device. The technology disclosed defines a TinyContainer framework to package TinyML models or other applications and their dependencies to run on provisioned devices. The machine learning models or other data processing logic that are packaged into Tiny-Containers (151) can be precompiled by PyTorch™, CoreML™, TensorFlow™ or other similar machine learning frameworks. Technology disclosed includes compilation tooling with software development kits or SDKs for building TinyContainers. An operating system called TinyOS 303 can directly boot TinyContainers and expose hardware capabilities with an access layer common to heterogeneous devices.

TinyContainers can be booted using the TinyContainer bootloader 311 which is initiated by the TinyOS (303). The TinyOS includes a collection of application programming interfaces or APIs that provide access to the sensors, communication stacks, and memory/filesystems. The TinyVirtualization API (309) enables encapsulation and execution of user space bytecode in TinyContainer 151. A libTinyMesh (307) is a library that provides communication and monitoring of TinyContainer health. The edge device can include shared memory 313, and communication protocols 315. The capabilities 305 can provide input data required by Tiny-Container by accessing the functionality of the edge device.

Overview of Containerization

Figure 4:
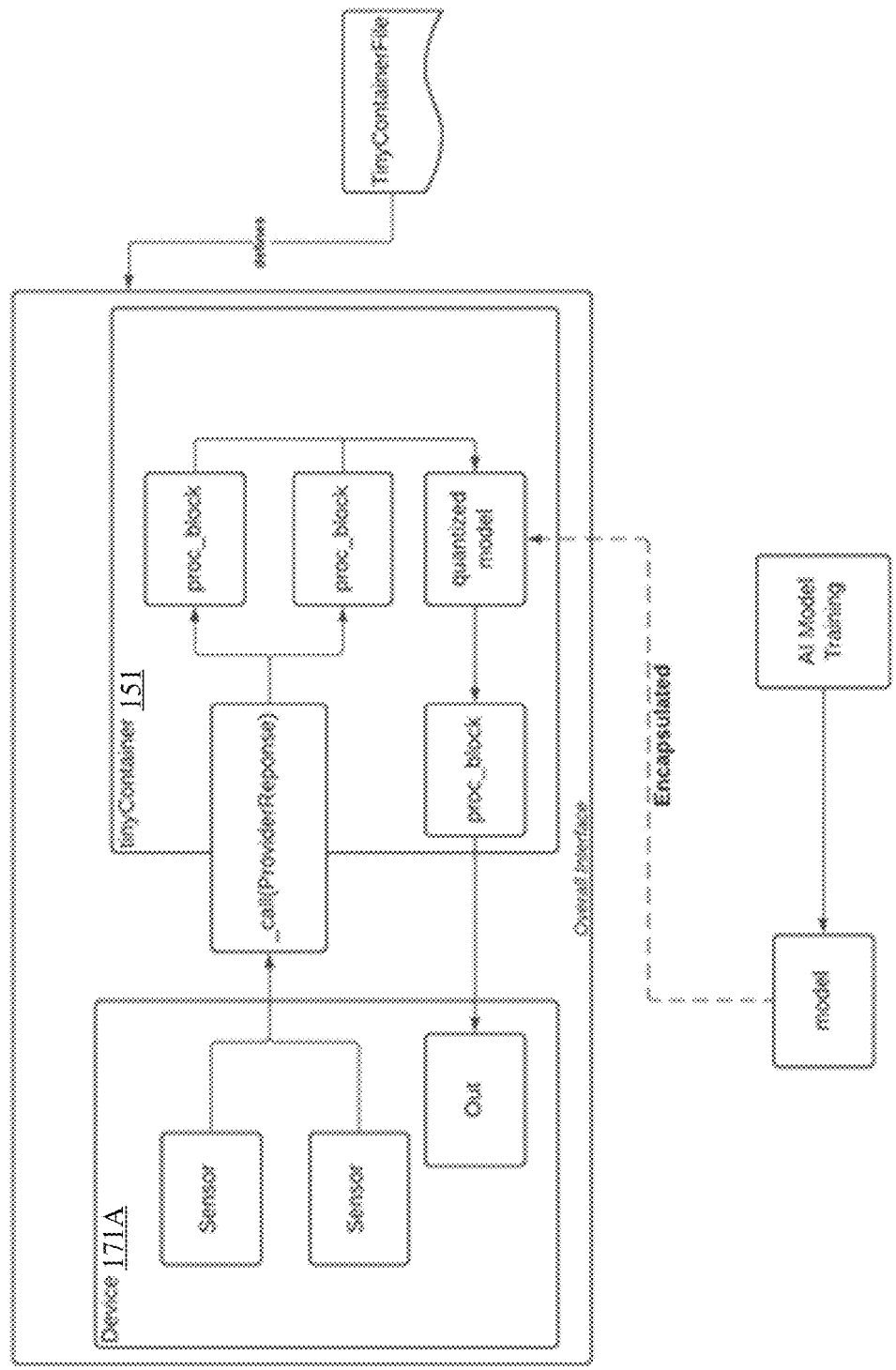
FIG. 4 presents an overview of processing of declarative instructions by the technology disclosed.

FIGS. 4 and 5 present an overview of the containerization using a declarative instruction set. In the following sections we present more details of the declarative instructions. We explain the declarative instructions using an example of a Sine function machine learning model which is built and deployed as a TinyContainer to an edge device.

TinyContainer Example—Sine Function

The technology disclosed presents cross-platform programming of TinyML applications or tiny sensor applications. A declarative instruction set is used to implement functions on the tiny machine learning (ML) hardware or other types of edge devices that can process data or signals collected by sensors. We present an example TinyContainer file that implements "Sine function model" that takes in a random floating point value provided by a host device's random number generator and outputs "1" or "0" based on thresholding the amplitude of the input signal. The technology disclosed implements a "CAPABILITY" interface in the TinyContainer file (or TinyContainer specification file) to collect data from the edge device. The TinyContainer is implemented using a TinyContainer specification file (or a TinyContainer file) as presented in the following section.

TinyContainer Specification File

There are six (labeled 1 through 6) instructions (also referred to as declarative instructions) in the TinyContainer file for the Sine function model as shown below:

Instruction #1. FROM tinyos/base
Instruction #2. CAPABILITY RAND rand --n 1
Instruction #3. PROC_BLOCK hotg-ai/pb-mod --modulo 360 mod360
Instruction #4. MODEL ./sinemodel.tflite sine --input [1,1] --output [1,1]
Instruction #5. CALL rand mod 360 sine
Instruction #6. OUT SERIAL In the following section, we provide further details of these declarative instructions and their respective properties (or parameters).

Figure 5A:
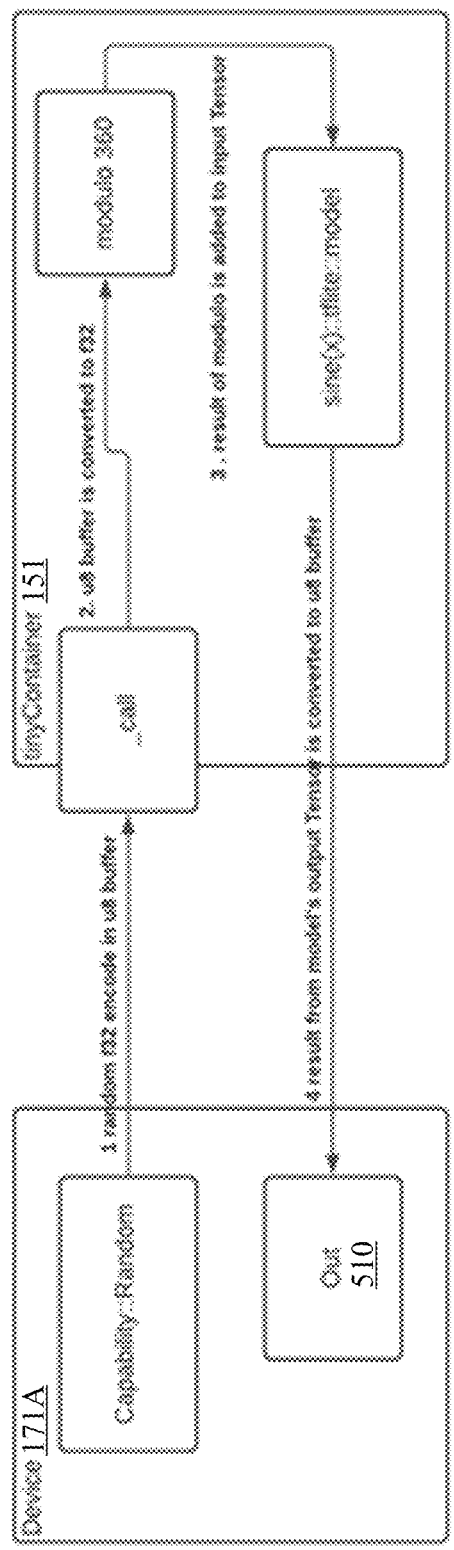
FIG. 5A illustrates interaction between a hardware device and TinyContainer for an example TinyContainer implementing Sine machine learning (ML) model.

FIG. 5A graphically illustrates processing of data from an edge device's "capability". The data from the edge device is processed by a TinyContainer 151 running on the edge device (also referred to as TinyDevice or Tiny ML hardware). The TinyContainer implements the example Sine function presented above. The TinyContainer generates a "serial" output (510) using the declarative "OUT SERIAL" instruction (labeled as instruction #6) in the example Tiny-Container file presented above. The functions listed in the blocks in FIG. 5A are explained in the following text using the instructions 1 through 6 of TinyContainer specification file presented above.

FIG. 5B presents the TinyContainer specification file with instructions 1 through 6 in another equivalent form. We have matched the above-listed instructions to relevant parts of the specification file in FIG. 5B. The instruction #1 is labeled as 551, the instruction #2 is labeled as 553, the instruction #3 is labeled as 555, the instruction #4 is labeled as 557 and the instruction #6 is labeled as 559. The TinyContainer specification file such as shown in FIG. 5B or presented above as declarative instructions labeled 1 through 6 describe a machine learning pipeline. The pipeline can be considered as key-value pairs where the key attaches a name to a particular stage of the pipeline. The pipeline can have six stages corresponding to the six instructions, such as FROM (or image), CAPABILITY (or capability), PROC_BLOCK (or proc-block), MODEL (or model), CALL, and OUT (or out). Note that CALL instruction is optional and is not present in the TinyContainer specification file in FIG. 5B. The Tiny-Container specification file can also include "identity" (571) and "debug" (575) stages as shown in FIG. 5C. The identity stage can be used to transform the output from a TinyML model in a readable format or in a format that is easy to understand such as true/false, 0/1, etc. The "debug_output" can be used when working on a new "procedure block" as it enables more useful stack traces and allows the developer to perform more assertions that are expensive to be present in a release build but may be helpful during development.

Figure 9:
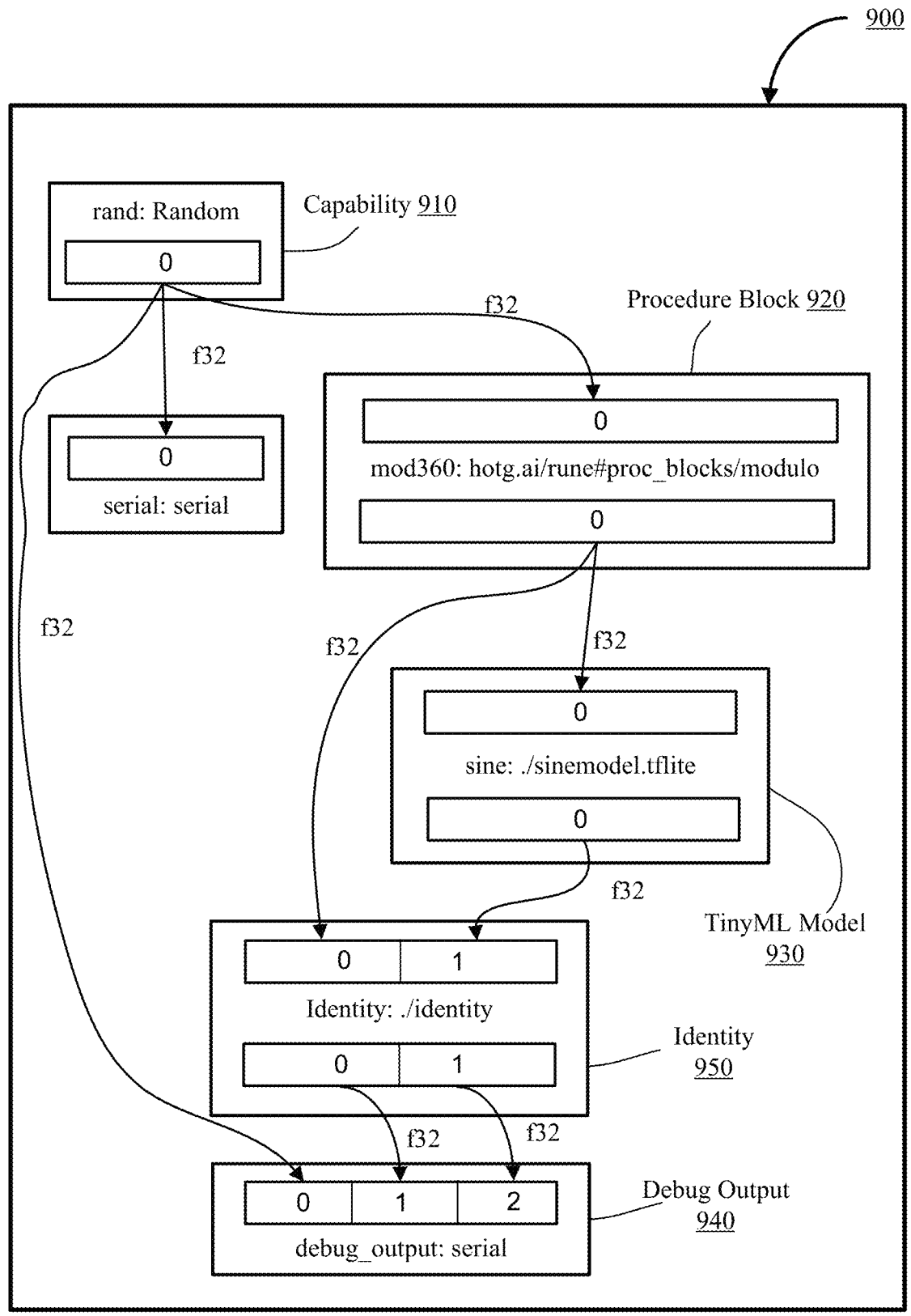
FIG. 9 is an example acyclic graph corresponding to a TinyContainer specification file.

The pipeline can be considered as an acyclic graph specifying how data is transformed as it passes through the TinyContainer. An example acyclic graph 900 for the TinyContainer specification file is shown in FIG. 9. The graph shows stages (corresponding to instructions) as nodes in the graph 900, including a capability node 910, a procedure block node 920, a TinyML model node 930, a debug output node 940, and an identity node 950.

Properties of Declarative Instructions

The stages (corresponding to declarative instructions) listed above can have properties such as arguments or (args), inputs, and outputs. We present brief description of these properties in the following paragraphs.

The "args" property can be used to modify data generation or data transformation. This can be a free-form dictionary of key-value pairs where the value can be a primitive type (e.g., numbers and strings) or a list of primitive type. For example, this property may include providing the sample rate to an audio capability or the list of labels to use when classifying. For some use cases like using an "enum" or calculated expressions, a "verbatim" argument value may be used. This may be a string prefixed with an "@" symbol (e.g., @PixelFormat::Grayscale or @244*244*3).

The "input" property can contain a list of strings specifying which stages a particular stage may receive input from. This can include the stage's name from which input is received, but in cases when a stage may have multiple outputs the desired output may be specified using a dot syntax. For example, the "debug" stage accepts three inputs, the first one is data from "rand" (labeled as 576 in FIG. 5C) and the other two are "0" and "1" from the "identity" stage which are taken as input by the debug stage 575. The two outputs from "identity" stage are shown as "identity.0" (577) and "identity.1" (578) in FIG. 5C.

The "outputs" property can specify the type of output data. This can include specification of the data type and shape of the data such as one dimensional, two-dimensional etc. A stage may have multiple outputs. For example, if using a procedure block to classify the two most confident inputs and return both the labels and confidence values, there will be two outputs.

A "dimensions" property specifies the shape of data (such as one-dimensional or multi-dimensional array, etc.) in row-major order. A table 580 in FIG. 5C presents different types of data types that can be supported by the TinyContainer specification file. It is understood that additional data types may be included in the instruction set.

We now explain the declarative instructions in lines 1 to 6 of the TinyContainer specification file and their respective properties. The TinyContainer file is processed to generate a manifest of dependencies and is compiled to bytecode. The manifest file is used to negotiate with the tiny edge device to determine if the edge device can support the deployment and execution of the TinyContainer bytecode.

FROM Instruction

A "FROM" instruction (instruction #1 of Sine function model presented above) defines the base layer on which the container is built. The "tinyos/base" parameter specifies a base file with which a manifest structure is associated. When processed, the "FROM" instruction causes verification that TinyOS is present and ready for loading of a TinyContainer and that dependencies are satisfied. In one implementation, a manifest structure is generated and used to verify that the dependencies on common APIs and data types can be satisfied by the edge device. Additionally, the TinyContainer files are composable. Developers may reuse prebuilt containers using "FROM tinyContainer-register/{name}" syntax. The TinyContainer file can use "image" instruction (as shown in FIG. 5B) in place of "FROM" instruction without impacting the functionality described above.

CAPABILITY Instruction

The instruction #2, "CAPABILITY RAND rand --n 1" references, for compilation, a "RAND" (random number generation) capability of the hardware with a parameter of "1" i.e., generating number with a floor value of "1". This requirement is also added to the manifest file which is processed by the "_manifest( )" API call.

The capability instruction in the TinyContainer file specification is a way to access the data produced by an operation or a function performed by a host hardware device. The host device can be a tiny ML hardware, or a sensor or another type of edge device. Capability instruction describes how data from tiny ML hardware or sensors or edge devices is captured for use by the TinyContainer. Examples of data from host devices can include images, audio samples, vibration data from accelerometers, temperature of an object, weight of object, a random number from a random number generator, etc. The capability instruction describes the data required from the tiny ML hardware and provide parameters for the format (or shape) in which data is required from the host device. The example capability instruction "CAPABILITY RAND rand --n 1" becomes a capability request as shown below:

```
CapabilityRequest {
    capability: CAPABILITY :: RAND,
    params: HashMap<String, String> :: new( ).insert("n", "1")
}
```

Available capabilities can have a variety of parameters that are specific to the type of capability. Some examples are listed below:
Audio Capability—Parameter List
1. hz—frequency of audio sampling
2. samples—number of samples to capture
3. mono/stereo—single or dual channel audio
4. sample_len_ms—number of milliseconds per sample
Accelerometer Capability—Parameter List
1. axes—X, Y, Z axes
Temperature Capability—Parameter List
1. normalize—normalize temperature to a range
2. unit—Kelvin, Fahrenheit, Celsius unit
All capabilities can have a parameter for name and type of data format (F32 floating point 32 or Unsigned int etc.). More examples of capabilities are presented below.

PROC_BLOCK Instruction

The instruction #3 in TinyContainer file presented above declares a processing or a procedure block (or "PROC_BLOCK" or "proc block") that can be defined by application hardware manufacturers or developers. A procedure block is also referred to as a machine learning procedure block or ML procedure block. The code in "PROC_BLOCK" follows specific implementation traits described by a processing function. The logic described in a procedure block exposes functionality for transforming data from one form to another. The procedure block can include logic to process the capability data from the tiny ML hardware device to form it to match the input data format required by the TinyML model. For example, the procedure block can apply normalization (such as min-max normalization) to an image pixel data before providing the image pixel data as input to an image classification tiny ML mode. The procedure block declarative instruction can be in a form such as following:

proc-block: hotg-ai/rune#proc_blocks/label

A procedure block identifier can be in a form such as "path@version#sub_path" where "path" is a required part of the identifier. The path describes a location at which the procedure block file is stored. The path can point to an external database, a disk relative to the TinyContainer file, an external source code repository accessible via the Internet, etc. For example, a "modulo" procedure block can be defined such that it can calculate the modulus of each element of a multidimensional array. For the Sine ML model example presented above, a "proc_block" 1000 can be defined to do modulo operation as shown in FIG. 10.

The "proc_block" (procedure block) can be added as a dependency to the TinyContainer and applied in the "CALL" instruction (instruction #5) as below:

CALL rand mod 360 sine
CALL Instruction

The instruction #5 is a "CALL" instruction that describes a pipeline to take capability data and send that data to a procedure block or machine learning models. The ordering is used to determine the typing between each component in the pipeline.

The procedure block can be used as a parameter in the "CALL" instruction (instruction #5). Lines 2, 3, and 4 in the TinyContainer specification file code set up the parameters of the CALL instruction that will invoke "_call( )" API. The model in line 4 is also referenced in the manifest. At line 5, the "CALL" instruction calls the random capability with "mod 360" function and then the instruction calls the "sine" model. The "rand" in CALL instruction (instruction #5) refers to "rand" in instruction #2. The "mod 360" in "CALL" refers to "mod 360" in instruction #3 and the "sine" in "CALL" instruction refers to "sine" in instruction #4. In one implementation, the "CALL" instruction is optional and the TinyContainer file may not include a "CALL" instruction listed as "instruction #5" in the Sine mode example presented above.

MODEL Instruction

The MODEL declarative instruction points to a location of a machine learning model relative to the TinyContainer file. The MODEL instruction for the Sine model example uses the following properties (as shown in instruction #4):

MODEL ./sinemodel.tflite sine --input [1, 1] --output [1, 1]

Figure 11:
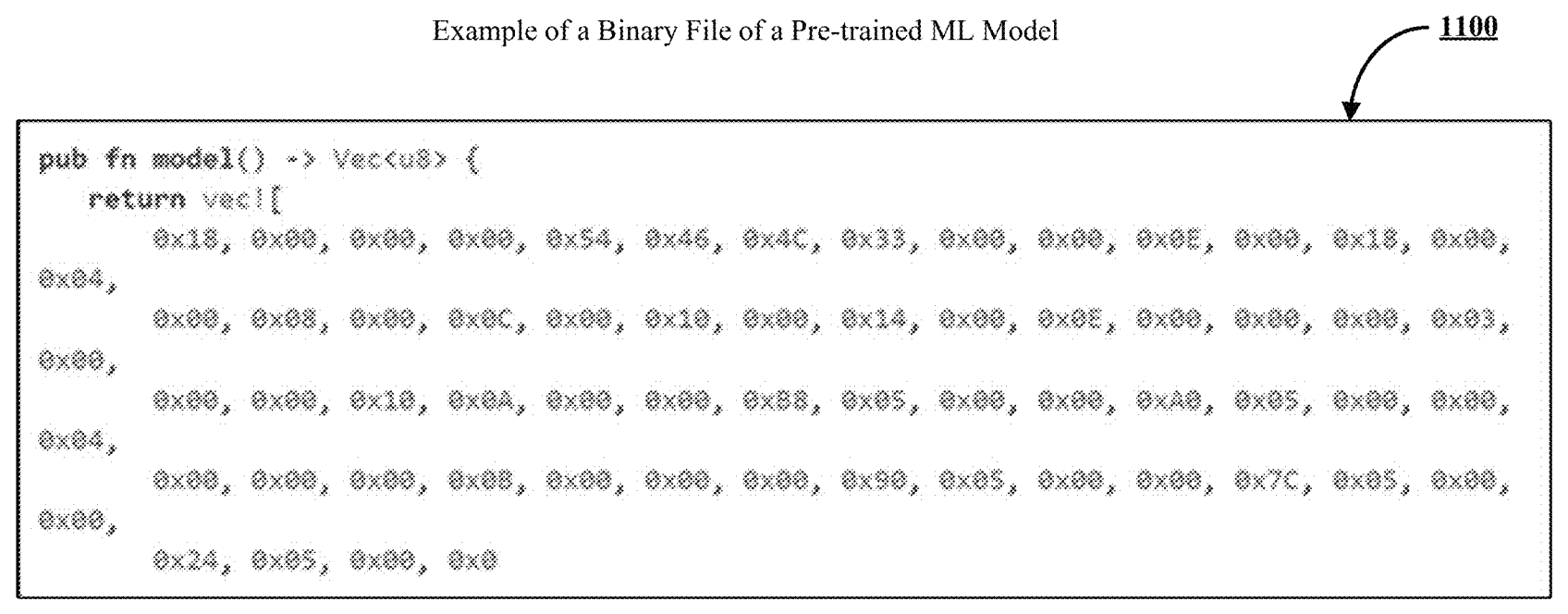

When the above declarative instruction is processed, a binary file of a pretrained model such as 'sinemodel.tflite' is loaded as bytecode to a tiny ML hardware or a tiny edge device. This bytecode is understood by preexisting libraries such as TensorFlow lite, ONXX etc. An example binary file 1100 is shown in FIG. 11.

The other parameters in TinyContainer file describe the format of the inputs and outputs as a vector matrix notation. In the following section, we present further examples of capability interface for different types of machine learning applications.

OUT Instruction

The "OUT" instruction (instruction #6 in Sine model example) provides a mechanism to pass information processed by the TinyContainer to outside world, e.g., an application running on a host device. The "OUT" instruction can include a property which specifies the type of output. For example, "OUT: serial" instruction indicates a serial output that can be in the form of JSON-formatted strings.

Initialization of TinyContainers

There are two steps to initialize a TinyContainer. The first step (a manifest step or a manifest stage) is to verify presence of TinySupport infrastructure required by the TinyContainer to run on the TinyML hardware device. TinySupport infrastructure can include the capability required, output required, dependencies required, etc. as described in a manifest file. During deployment or initialization of TinyContainer to a tiny ML hardware device, the "_manifest( )" API is used to verify or negotiate the required infrastructure with the TinyML hardware device. Other approaches to verify satisfaction of dependencies can be applied. The second step to initialize the TinyContainer (a call step or a call stage) is to provide the TinyContainer what it needs to run, which is achieved through the "_call( )" API.

Figure 6:
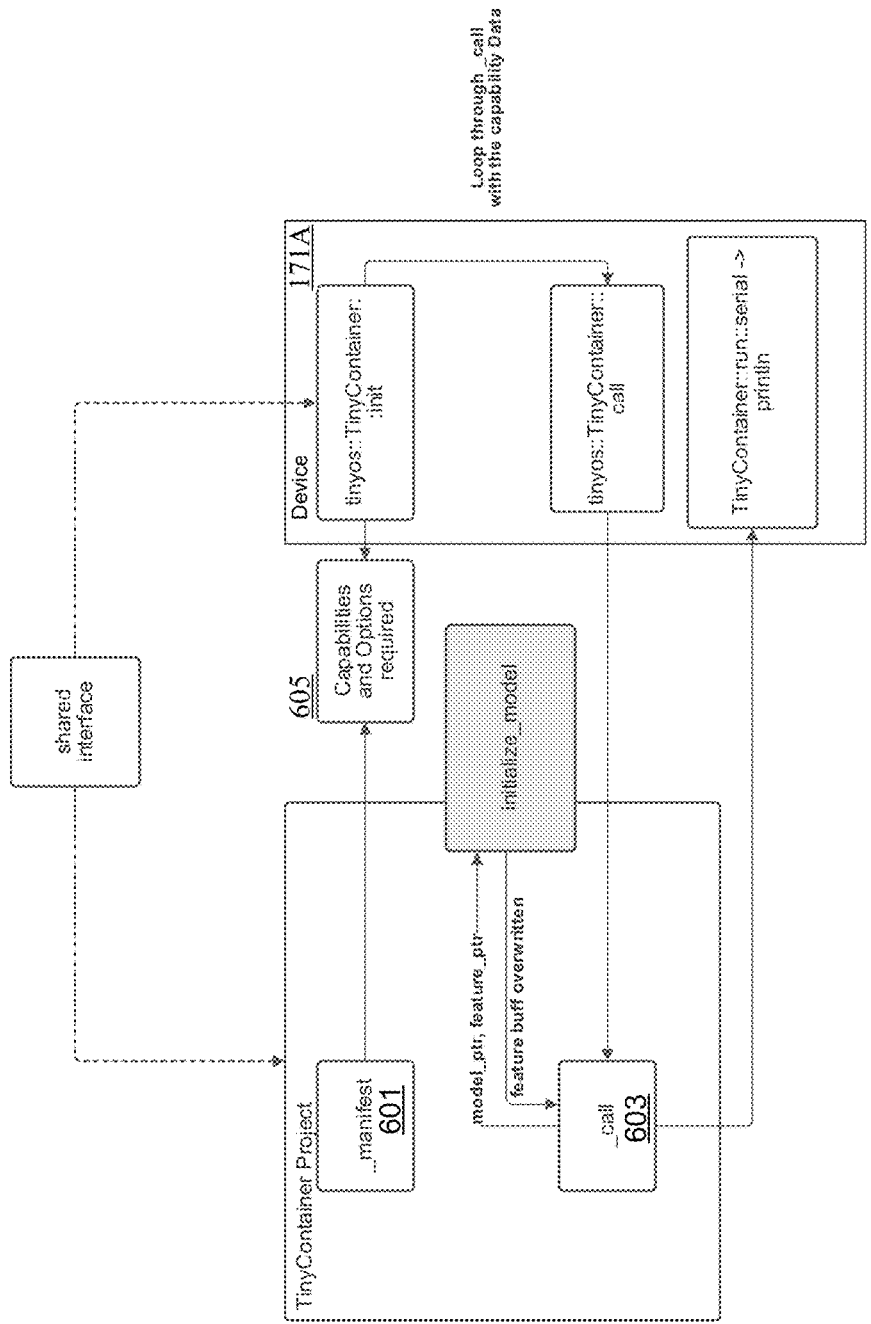
FIG. 6 presents processing of Sine ML model specification file by the technology disclosed.

FIG. 6 presents a diagram 600 indicating the manifest and call steps (or stages) of deploying a TinyContainer to hardware. In the first step of TinyContainer initialization, the dependencies specified in instructions 2 to 6 of TinyContainer specification file can be compiled into a manifest used in a "_manifest( )" call 601. The "_manifest" call is used to verify that the hardware satisfies dependencies specified in the TinyContainer specification. The structure of a manifest is explained below. Specification of dependencies can be invoked by the instructions that compile the TinyContainer (line 2-6). This process ensures that compilation, loading and running a function can succeed. The technology disclosed provides a base layer called "TinyOS" on the edge device which runs the bytecode. The "FROM" instruction allows composability among containers, which supports building a second container on top of a first container. Composability is a design principle that deals with inter-relationship of components. A highly composable system provides components that can be selected and assembled in various combinations to satisfy specific user requirements. Two features that make a component (or a container) composable require that the component (or container) be self-contained (that it can be deployed independently) and stateless (that it treats each request as an independent transaction). The TinyContainer fulfills these two criteria.

In the second step of TinyContainer initialization, the "_call( )" API (603) as shown in FIG. 6 is invoked. This step is performed following compilation of the bytecode from the declarative instructions 2 to 5. In this step, the bytecode is executed, the model is run, and the data from the provider (or device) is processed to an output. The reason to have a two-step process is to ensure that the device may not fail when the "_call( )" API is executed, as the process has already determined that dependencies required to run the TinyContainer are present, by processing the manifest. Upon compilation of instructions in lines 1 to 6, the system execute the "_manifest( )" and "_call( )" API functions.

Manifest Object and _manifest( ) API

The "_manifest( )" API can be invoked by sending a manifest object to a TinyOS loaded on the Tiny ML hardware device. The manifest object describes dependencies of the TinyContainer, including models that are compiled into the TinyContainer and the output channel. A prototype manifest follows:

---

Struct Manifest {
    Capabilities: Vec<CapabilityRequest>,

```
    Out: OUTPUT,
    Models: Vec<Model>
}
```

The "_manifest( )" API call is used by the provider to ensure that the hardware has the right capabilities and memory space to run the model described. The TinyContainer file for the Sine ML Model presented above is described as a manifest code. Specific parts of the TinyContainer file are used to describe the manifest. A manifest for the sine function example 700 is presented in FIG. 7. In this example, the instruction #2 "CAPABILITY RAND rand --n 1" is reflected in "capability: CAPABILITY::RAND" (703) with HashMap parameter within the manifest. In FIG. 6, the "Capabilities and Options required" box 605 illustrates a verification or negotiation that happens between the TinyContainer and the TinyOS running on the device (from provider). During this negotiation, the device indicates if it can run the TinyContainer by providing the data and capabilities required by the application code and model.

_call( ) API

After the manifest stage is complete, the bytecode is loaded so the device can run the TinyContainer. The device can then call the "_call( )" API (603) and collect the Provider Response from the hardware in a stable interface defined here. The structure definitions described below can be used to generate the bytecode.

```
struct ProviderResponse {
    inputs: Vec<CapabilityResponse>,
    err: Option<String>
}
struct CapabilityResponse {
    type: CAPABILITY,
    input: Vec<u8>
}
```

The Sine function example 800, presented in FIG. 8, requests data from a secure random chip on the hardware which returns a f32 of 1 (since the parameter is 'n=1').

CAPABILITY Instruction Examples

We present several examples of CAPABILITY instruction used by the technology disclosed to access data from edge devices. Examples of capabilities of edge devices can include AUDIO, CAMERA, ACCELEROMETER and SERIAL_IN. A table 820 in FIG. 8 presents examples of capabilities, their descriptions and supported arguments. Examples listed in the table include "ACCEL" capability that can capture samples from an accelerometer as three "f32" values X, Y, Z. A "RAND" capability to generate random data from the runtime's random number generator. The random number generator can be implemented in hardware or software by the TinyML hardware device. A "RAW" capability to collect raw data from a user-specified source. A "SOUND" capability to capture audio samples such as 16-bit pulse code modulated audio samples. An "IMAGE" capability to capture images which can be RGB or grayscale images. The capability instruction can also specify data capture rate or other parameters using "args" property.

Cough Detection Example

The following TinyContainer file implements a cough detection example by capturing audio to detect if a person is sick. The edge device can be positioned in an office or a home environment.

1. FROM tinyos/base
2. CAPABILITY AUDIO audio --hz 16000 --samples 150 --sample-size-ms 1500 --output U8
3. PROC_BLOCK tinyos/proc-block/fft fft --input I16
4. MODEL ./cough_detector.tflite model --input [150,1] --output 1 --labels cough,not_cough --input F32
5. CALL audio fft model
6. OUT serial Person Detection Example The person counting example captures an image from a camera, runs an object detection model on them, followed by a logic that counts the number of persons detected in the frames. This is then sent to a dashboard for visualization. The TinyContainer file for person detection is presented below:

1. FROM tinyos/base
Capture input images from a camera
2. CAPABILITY CAMERA camera --fps 0.1 --frame-width 1080 --frame-height 720
Object detection model
3. MODEL ./efficientDet.tflite model
4. PROC_BLOCK count.rs count
5. CALL camera model count
6. OUT http_post https://dashboard:8080/persons Accelerometer Anomaly Detection Example The following example detects anomaly by capturing data from an accelerometer attached to an industrial appliance. The TinyContainer implementation transforms this input to frequency domain and passes this data to an autoencoder that can reconstruct the input. Samples with a high reconstruction error can then indicate anomalies. The system can activate an alarm if an anomaly is detected. The TinyContainer specification file for anomaly detection example is presented below:

1. FROM tinyos/base
2. CAPABILITY ACCELEROMETER accelerometer --samples 1024
3. PROC_BLOCK tinyos/fft fft
autoencoder used for anomaly detection
4. MODEL ./autoencoder.tflite model
Some custom code to check if an anomaly has been detected
5. PROC_BLOCK threshold.rs threshold
6. CALL accelerometer model threshold
Play an alarm if an anomaly was detected
7. OUT audio alert.wav Smart Appliance Detector Example The smart energy appliance recognition TinyContainer can continuously monitor the electricity consumption in the house using a smart meter to predict which appliance was active at a certain time based on the characteristics of the energy consumption. The TinyContainer can be used to keep track of how much electricity each appliance consumes. The specification file for Smart Appliance detector example TinyContainer is presented below:

1. FROM tinyos/base
Current energy consumption is written to serial
2. CAPABILITY SERIAL_IN serial --bps 9600 --samples 1024
model that predicts which appliance is active
3. MODEL ./appliance_classifier.tflite model
4. CALL serial model
5. OUT serial Self Service Checkout Example An automatic fruit or vegetable self-checkout can be implemented using a TinyContainer. When a customer puts fruit or vegetables on the attached scale, a camera can be activated. Following this, the TinyContainer runs an object recognition model on the image captured by the camera. The price is calculated based on the item and weight. The specification file for self-service checkout TinyContainer is presented below:
1. FROM tinyos/base
Capture input images from a camera
2. CAPABILITY CAMERA camera --frame-width 1080 --frame-height 720
3. CAPABILITY SERIAL_IN scale --bps 9600
A custom processing block that continuously monitors the scale and that activates the camera
when it detects something has been put on it
4. PROC_BLOCK monitor_scale.rs monitor --input scale
Object detection model
5. MODEL ./resnet50.tflite model
Waits until something is put on the scale, take a picture and run the classification model
6. CALL monitor camera model
7. OUT serial Image Capture Example Image capture system can be implemented for mobile devices. The system can identify a person based on camera input. The system can allow each device can learn its individual classification threshold (e.g., depending on the lighting conditions of its placement). TinyContainer file defines an image analysis model interface that works on operating systems from multiple device manufacturers. Example capability interface implementation is presented below:
   a. Input: Image (2D/3D)
   b. Output: metric on image/decision/signal (2D/1D)
1. FROM tinyos/base
2. CAPABILITY CAMERA camera --fps 3 --width 224 --height 224
3. MODEL MobileNetV2.tflite model
4. PROC_BLOCK cosine_distance cosdist
5. CALL camera model cosdist Gas Sensors Example The system can deploy a learning model onto multiple sensors from different manufacturers to alert on air quality drops across multiple geographies. The system can detect gas leaks based on gas sensor input. Alerts can be generated based on the current vs. "normal" level of air quality in the environment for each individual gas sensor. Example capability interface implementation is presented below:
   a. Input: Signal (1D)
   b. Output: Classification decision label
1. FROM tinyos/base
2. CAPABILITY GAS_SENSOR gas_sensor --fps 5
3. MODEL AnomalyDetectionRnn.tflite model
4. CALL gas_sensor model Pressure Sensors Example The technology disclosed enables deploying the same signal analysis model file on weather balloons from multiple manufacturers, running different operating systems. The system can estimate atmospheric pressure on weather balloons. Example capability interface implementation is presented below:
   a. Input: Signal (1D)
   b. Output: Decision/class/signal (1D)
1. FROM tinyos/base
2. CAPABILITY PRESSURE_SENSOR pressure_sensor --fps 5
3. MODEL PressureEstimationANN.tflite model
4. CALL pressure_sensor model Chemical Sensors Example The technology disclosed can be used to deploy TinyContainers in a drug factory environment. The system can deploy models to monitor for quality control at multiple points of a manufacturing pipeline from multiple sensors. Example capability interface implementation is presented below:
   a. Input: Signal (1D)
   b. Output: Signal (1D)
1. FROM tinyos/base
2. CAPABILITY CHEMICAL_SENSOR chemical_sensor --fps 7
3. MODEL ChemicalAnalyzerANN.tflite model
4. CALL chemical_sensor model Detecting Walk Example The technology disclosed can use capability interface for accelerometer sensors to detect walking from acceleration on a smart watch. TinyContainer file generalizes over multiple sensor types for multiple operating systems. Example capability interface implementation is presented below.
   a. Input: Signal (1D)
   b. Output: Classification/Signal
1. FROM tinyos/base
2. CAPABILITY ACCELEROMETER accelerometer --fps 7
3. PROC_BLOCK TrajectoryIntegrator trajectory_integrator
4. MODEL WalkDetector.tflite model
5. CALL accelerometer trajectory_integrator model Additional Examples of Capability Interface Other examples of capability interfaces implemented by the technology disclosed include:
   Position sensors—construct trajectory from position
   Current & Voltage sensors—on MCUs (micro controller units) adjust clock speed as a function of battery percentage to save battery
   Torque, Strain, Gage & Force sensors—adjust mobile robot electric motor power in response to torque sensor
   Temperature sensors—turn off device when too hot
   Optical sensors—light diode
   Velocity sensors
   Flow sensors Provisioning Hardware devices require application code to be compiled against hardware SDKs meaning new codes cannot be run directly. With provisioning, the technology disclosed can make devices ready to execute TinyContainers so that new TinyML applications can be deployed without recompiling. Recompiling is expensive for developers and prevents live updates on edge devices. The technology disclosed can include TinyConfig configuration protocol that can enable hardware providers to make their devices TinyContainer ready.

We present an example in deployments section below, illustrating hardware device-specific provisioning code. Similar device-specific code can be generated for other devices. The technology disclosed can automate the process of deployment of TinyContainers for hardware devices from different providers. This process includes generating a bootloader or a virtual machine which is hardware specific. A bootloader, a boot program, or a bootstrap loader is a special operating system software that loads into the working memory of a computer after start-up. In case of TinyContainer, the bootloader is provided by the technology disclosed that assures that TinyContainer boot code can run on the hardware devices.

A drag and drop user interface can be provided to developers to select configurations. The system can then automatically generate a bootloader for the hardware device using selected configurations. Once the bootloader or virtual machine is deployed to the hardware device, the hardware device becomes ready for deployment of TinyContainers.

Deployments

The technology disclosed can provide tooling platform to enable users to deploy TinyContainers to virtual machines for testing and on real devices over the air and wire communication channels. TinyDeploy tool provides functionality for working with TinyContainers. TinyDeploy commands fall into one of the following categories. Additional commands can be included in the tool to provide additional functionality related to provisioning, deployment and debugging of TinyContainers.

In another implementation, a TinyDeploy API service provides functionality for working with TinyContainers. TinyDeploy APIs also fall into one of the following categories. Additional APIs can be included in the service.

Declarative Resource Management (Deployments and Operations)
 a. The TinyDeploy tool provides commands to manage a mesh of devices with resource configurations defined in TinyConfig files.
 b. TinyDeploy tool can parse, simulate and test TinyConfig configuration.
 c. A TinyConfig declarative specification can be developed.

Debugging TinyContainers
 a. The TinyDeploy tool includes commands to manage TinyContainer executions using command line interface (CLI) arguments and flags.
 b. The TinyDeploy tool includes commands to print and collect TinyContainer logs.
 c. In the implementation using TinyDeploy API service, API endpoints and flags are used to manage TinyContainer executions.
 d. In the implementation using TinyDeploy API service, the APIs can be used for collecting TinyContainer telemetry and provide observability into the TinyContainer application performance.

Debugging Resources
 a. The TinyDeploy tool includes commands to print and summarize states of TinyContainers and Resources in TinyMesh meshes.
 b. The TinyDeploy tool includes commands to printing complete state and information of resources.
 c. The TinyDeploy tool includes commands to query resources (such as devices and device groups), TinyContainers with matching labels (crucial for managing complex meshes and TinyContainers at scale).
 d. The TinyDeploy tool includes commands to perform limited direct execution control of devices for debugging purposes.

Debugging TinyMesh
 a. The TinyDeploy tool includes commands to print mesh events: leader election, consensus results, etc.

To support the above TinyDeploy commands, the technology disclosed can include protocols to check, and verify that TinyContainers can run on the target devices. The protocol can abstract away communication protocols to the devices. Technology disclosed can leverage LoRaWAN, BLE, Wi-Fi and Serial communication protocols to communicate to target devices. We present further details of some example TinyDeploy commands and APIs in the following section.

Examples of TinyDeploy Commands

We now present examples of TinyDeploy commands in "services" and "targets" groups as shown below. A general structure of the TinyDeploy commands is presented below:
    $ hmr
    Usage: hmr [OPTIONS] COMMAND [ARGS] . . .
    Options:
        --help Show this message and exit.
    Commands:
        services
        targets In another implementation, the TinyDeploy is provided as a SAAS (software as a service) tool. In this implementation, a general structure of the TinyDeploy API endpoints in "deployment" and "targets" groups is presented below:
    GET tinydeploy/api/deployments
    GET tinydeploy/api/targets In the following sections, we present examples of TinyDeploy commands and TinyDeploy APIs to perform some common TinyContainer deployment and management tasks.

Listing Device Targets Using TinyDeploy Command

A table 1200 in FIG. 12A is an example of displaying devices that are available for deploying TinyContainers as a result of "target ls" command. For each device, a location of the device is listed under the "Target" heading. A type of communication protocol to communicate with the device is listed under the "Type" heading. A name of the device as provided by the manufacturer is listed under the "Name" header and availability of the device is listed under the "Avail" header.

Listing Device Targets using TinyDeploy API

In another implementation, the TinyDeploy is provided as a SAAS (software as a service) tool. In this implementation, a TinyDeploy API endpoint for listing target devices is presented below:
    GET tinydeploy/api/targets The "targets" API returns an array of objects representing edge devices. Each object can include an "identifier" (or id) of the device, a "name" of the device, one or more "tags", a "status" of the device, a "protocol" for network connection, and a "logs" field including an API endpoint for accessing the operational log of the device. An example of "targets" API call is shown in a box 1250 in FIG. 12B. The array returns with two objects 1253 and 1255. The first object represents a device with a name "arduino-ble-nano33". The object 1253 also includes other information regarding this device, arranged according to the fields or elements listed above. The second object 1255 represents a device with a name "factory-noise-signal-app". The object includes information for the object arranged according the fields listed above.

Deploy a TinyContainer to a Target Device Command

FIG. 13A shows an example of command "$hmr targets cast -t 56c0a255-7c45-44c9 ./sine.tinyContainer" to deploy a TinyContainer to a target device. In response to this command, the system verifies the TinyContainer and then checks the manifest to determine if the TinyML hardware device can provide the capabilities and output required. The system response to "target" command is presented in a block 1300.

Deploy a TinyContainer to a Target Device using TinyDeploy API

In another implementation, the TinyDeploy is provided as a SAAS (software as a service) tool. The system provides an API endpoint "PUT tiny-service/api/target --body {"id": "56c0a255-7c45-44c9", "container": "./sine.tinycontainer"

which can be used to deploy the TinyContainer to a target device. The above-listed API call is labeled as 1353 in a box 1350 in FIG. 13B.

The connected "targets" (i.e., edge devices) that match the "targets" flag in the API call 1353 by either matching "ids" (identifiers) or matching "tags" are updated with the Tiny-Container. Logs can be requested for a deployment of TinyContainers to edge devices. FIG. 13B shows two devices 1355 and 1357 that are matched. The first device 1355 is matched using the "id" in the targets flag while the second device 1357 is matched using the "tag". The Tiny-Container "./sine.tinycontainer" provided in the API call is then deployed on the matched target devices.

Determine Services Running on a Target Device Command

FIG. 14A shows an example command "services ls" to identify services (or TinyContainer instances) running on devices. The results of the "service ls" are shown in a table 1400 in FIG. 14A. The system shows the identity of a device, a name of the device, the target location, the provider information, and a status of the edge hardware device such as "running", "restarting", etc.

Determine Deployment Running on a Target Device using TinyDeploy API

In another implementation, the TinyDeploy is provided as a SAAS (software as a service) tool. In such an implementation, the system provides a "deployments" API endpoint which can be called as following to identify deployments (or TinyContainer instances) running on devices.

GET/api/deployments

The "deployments" API returns an array of objects representing edge devices as shown in a box 1450 in FIG. 14B. Each object can include an "identifier" for the device and a "name" of the device. Additional fields providing more information about the target device can be included. FIG. 14B presents an example array returned as a result of the "deployments" API call. The array includes three objects corresponding to three devices with their respective identifiers and names. The object 1453 represents a first device and includes the identifier and the name of the device. Similarly, the object 1455 represents a second device and includes the identifier and the name of the device. A third object 1457 includes the identifier, the name, and a "tag" for the device which provides additional information regarding the device. For example, in this case, the tag field indicates that this is a factory manager's mobile app. The third object 1457 also includes a "log" field which can include an API to access the operation logs of the edge device.

Collecting Logs of the Service Runs Command

FIG. 15A shows an example of using "services logs" command using the TinyDeploy tool to collect logs from the TinyDeploy services. One or more target devices can be identified in the command to collect the logs data. The log data of the target device returned as a result of "service log" command is shown in a block 1500.

Collecting Logs of the Service Runs using TinyDeploy API

In another implementation, the TinyDeploy API provides an API endpoint "GET tiny-service/api/deployments/:id" to collect logs from TinyDeploy services. The TinyDeploy API also provides another API endpoint as shown in a box 1550 in FIG. 15B to collect logs. The API call 1583 can be used to get operation logs of target devices in a deployment configuration. In some implementation, a deployment configuration can include a plurality of edge devices positioned in an environment such as a factory, a plant, etc. The API call 1583 returns an array of objects in which an element of the array is a log entry for an edge device in a deployment. For example, the log entry 1585 can correspond to a first device in a deployment and a log entry 1590 can correspond to a second device in the deployment. A log entry for a device can include a "deviceId" identifying the device, a "tag" providing more details about the device such as the location of the device or owner of the device, etc. The log entry can also include an "event" indicating an operation performed at the device. For example, the log entry 1585 includes a "container_executed" event and the log entry 1590 includes "inference completed" event. The log entries can also include a timestamp indicating "createdAt" a time which can be a time when the event happened at the device. Another timestamp "recordedAt" indicates a time when the event was recorded.

Deploying TinyOS on a Hardware Device

FIG. 16 presents an example code 1600 for deploying TinyOS on a hardware device. In this example, the TinyOS is deployed to an Arduino device. Similar implementation can be used for deploying TinyOS on other hardware devices.

Examples of TinyDeploy Dashboard

Figure 17:
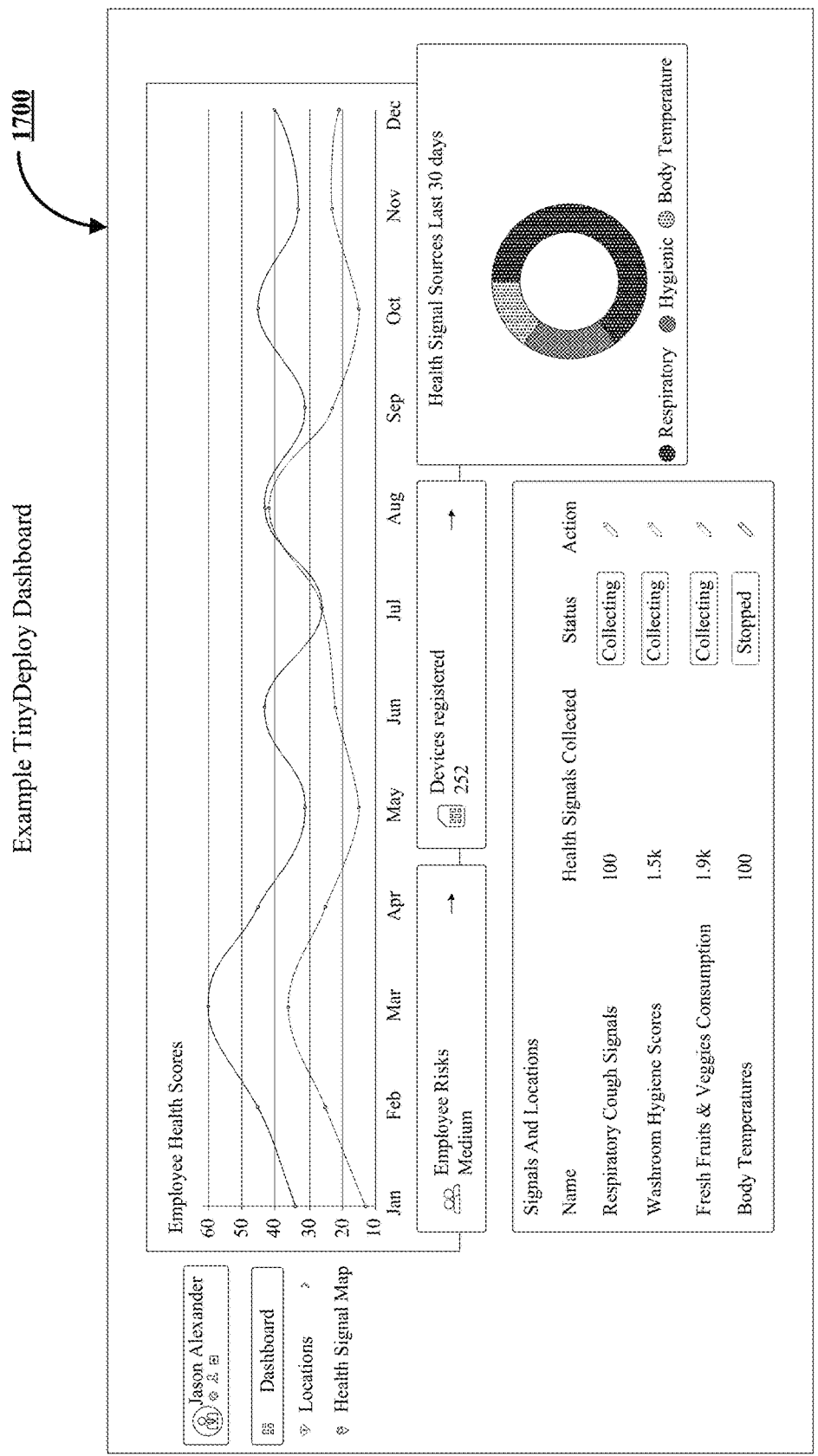
FIG. 17 is an example dashboard for TinyDeploy tool presenting data from Tiny ML hardware devices.

The TinyDeploy tool can present data from devices in a dashboard for further analysis. An example dashboard 1700 is presented in FIG. 17. The example dashboard lists different types of signals collected. Each signal type is identified by a "name" of signal collected. For example, "Respiratory Cough Signal", "Washroom Hygiene Score", "Fruits and Vegetables Consumption", and "Body Temperature". For each type of signal, the number of "signals collected" are listed and the "status" is listed as "Collecting" or "Stopped". The user can define actions for the signals using the dashboard such as generating an alarm or a notification when value of one or a combination of signals exceeds above a threshold or drops below a threshold. A graphical representation of signals collected can be presented such as in a pie chart as shown in FIG. 17. The aggregate data can be presented in the graph for a time duration such as one week, one month, one year, etc.

Four Use Cases of TinyDeploy to Deploy TinyContainer

Figure 18A:
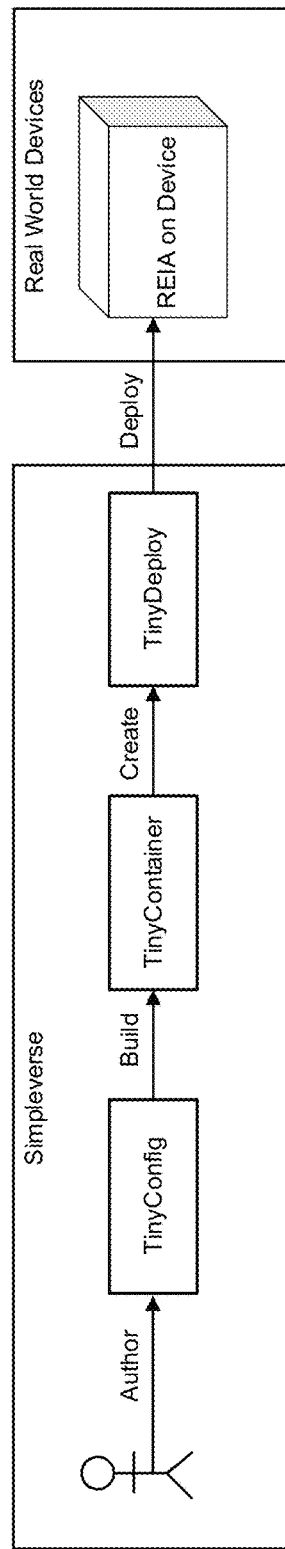
FIGS. 18A-18D present four use cases of deploying TinyContainer applications to hardware devices.

FIGS. 18A, 18B, 18C, and 18D present high-level interaction diagrams for three different use cases of TinyDeploy to deploy TinyContainer on one or more devices over wireless or wired connections. The TinyDeploy can also perform live updates, i.e., it can replace an existing Tiny-Container with a new TinyContainer on a device. The TinyContainer can run machine learning applications or TinyML models. In the following figures, the application running on the device is referred to as REIA (resilient edge intelligent applications). REIA can be a machine learning model, a TinyML model or other application running on hardware devices or tiny hardware devices. FIG. 18A presents a simple use of deployment of TinyContainer to hardware devices (labeled as 1800).

Figure 18B:
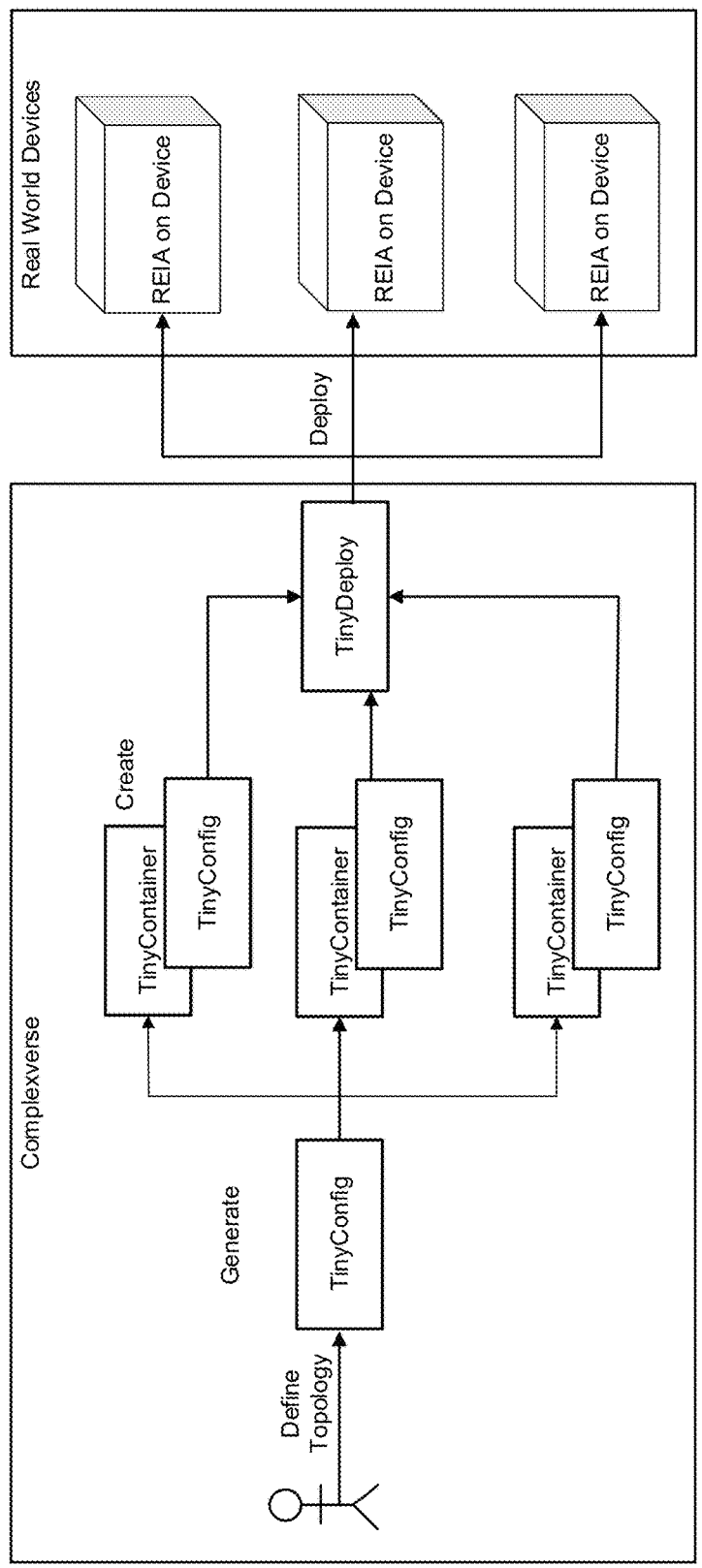

FIG. 18B presents a complex deployment use of Tiny-Container applications on hardware devices (labeled as 1830). In one implementation, one TinyConfig per Tiny-Container can create a configuration for deployment of TinyContainer. In this implementation, the TinyConfig common for all TinyContainers can be removed. The TinyDeploy tool then deploys the TinyContainers on hardware devices.

Figure 18C:
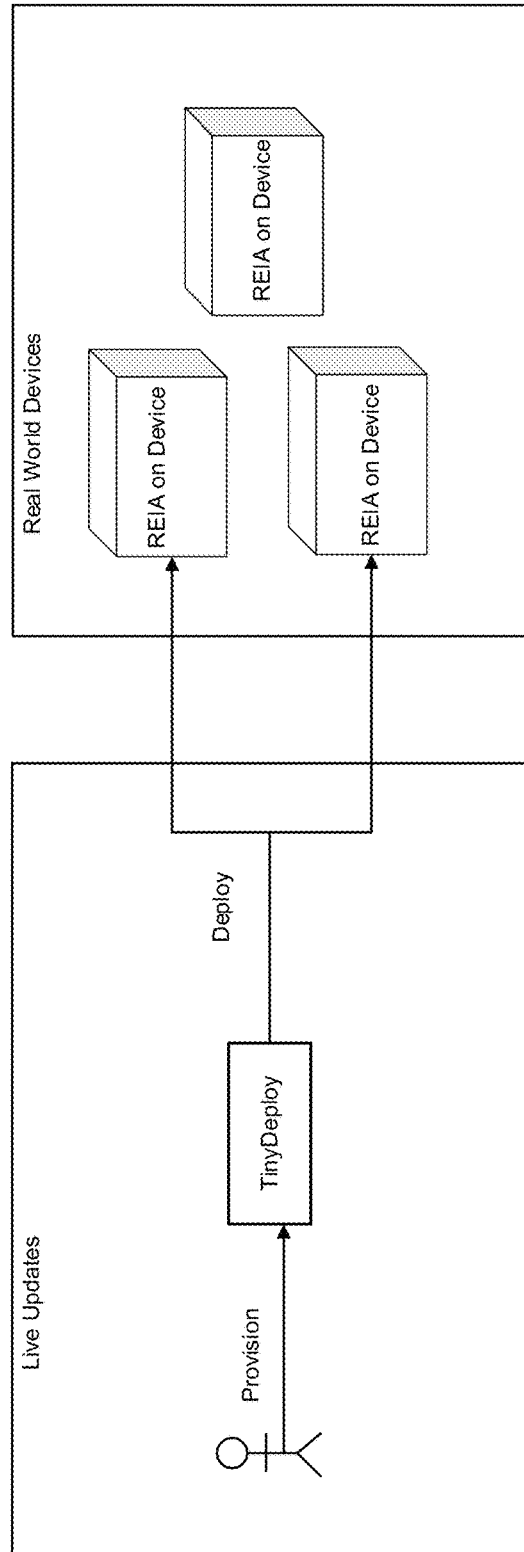

FIG. 18C presents another use case 1860 of the technology which includes a provisioning step before deployment. In the provisioning step, the devices can be prepared for deployment of TinyContainer. This implementation can include live updates to devices. In such an implementation, the previously deployed TinyContainer can be removed from the hardware device and new TinyContainer can replace it.

Figure 18D:
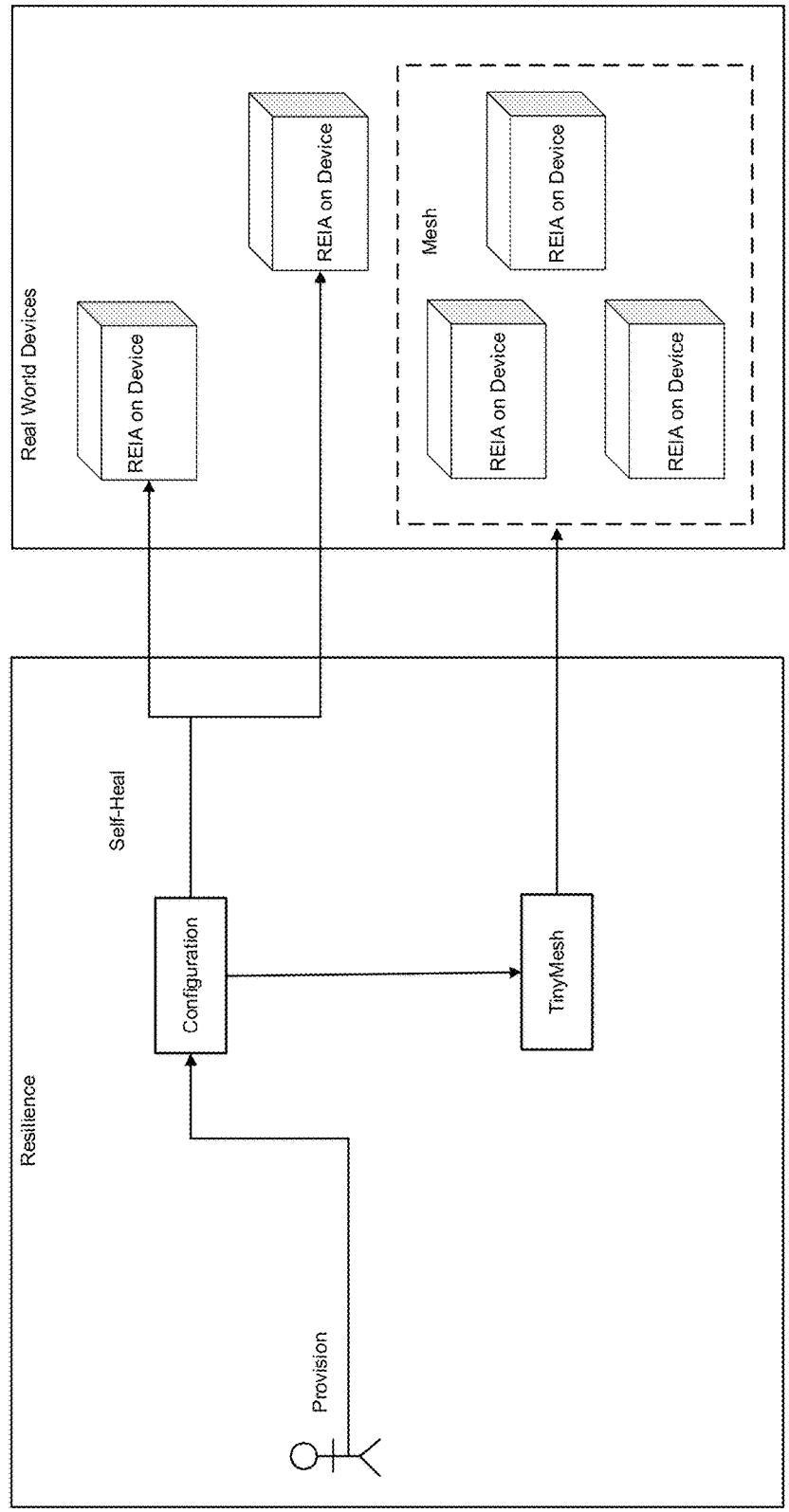

FIG. 18D presents a use case 1880 that includes resilience by using a TinyMesh to deploy TinyContainers to devices in a mesh. The mesh can provide resilience by selecting an alternative hardware device to run the TinyContainer when a hardware device fails.

Multiple Deployment Use Case including Receive Function of TinyDeploy

Figure 19:
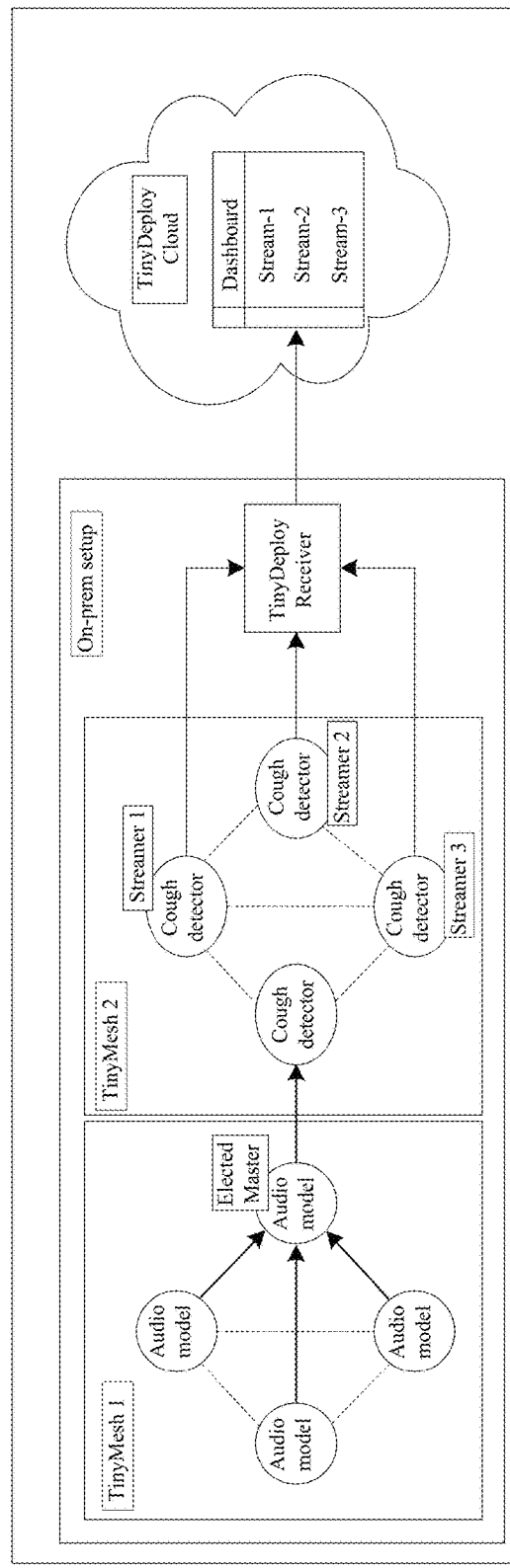
FIG. 19 presents generation of a configuration to deploy TinyContainer applications to hardware devices.

FIG. 19 presents a use case 1900 in which the technology disclosed can include multiple deployments. The multiple deployments are referred to as "TinyMesh 1" and "TinyMesh 2". One deployment can communicate with other deployments of hardware devices via elected master device in the TinyMesh. As shown in FIG. 19, TinyDeploy can receive data or instructions from multiple edge devices in one or more TinyMesh. Different types of edge devices (such as cell phones, Arduino devices, Raspberry PI devices, or other IoT devices including low power devices etc.) can be connected together form a mesh. The receiver functionality of TinyDeploy is shown as TinyDeploy Receive in FIG. 19. The example presented in FIG. 19 can be used to collect sensor data from edge devices, cell phones, etc. to detect cough or sneezing sounds in various areas of an office building. The data is anonymous and remains at the edge devices for privacy reasons. A dashboard at the HR office can show results in a dashboard to indicate which part of an office building has a higher risk for spreading virus, or rooms with higher density of people, etc. This can indicate need to sanitize a room or an area of an office.

The technology disclosed can also include a cloud-based implementation of the TinyDeploy referred to as "TinyDeployCloud". A dashboard can be provided to present the data or aggregated data collected by TinyDeploy from edge devices. FIG. 17 is an example dashboard provided by TinyDeploy. To meet higher data privacy requirements, the technology disclosed can use local storage of data instead of cloud storage and use a locally deployed TinyDeploy tool instead of TinyDeploy Cloud.

Figure 20:
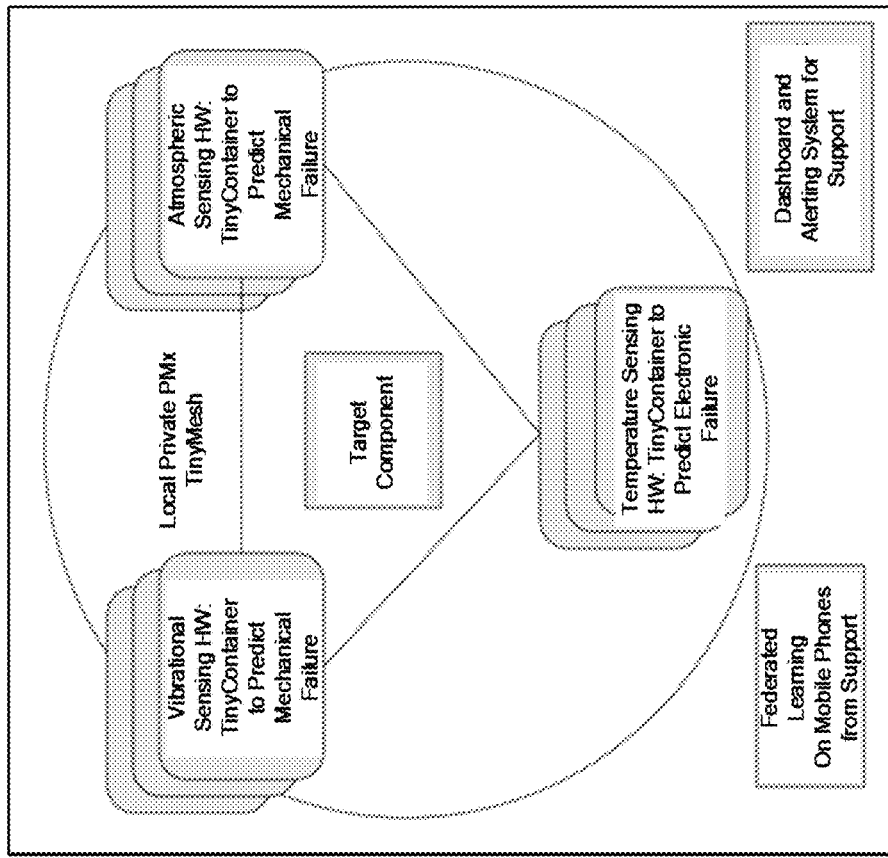
FIG. 20 presents an example of predictive TinyMesh to send alerts for a target hardware device.

FIG. 20 presents an example 2000 of multiple TinyMesh which can include different types of sensors to predict failure of one or more target components. For example, in one TinyMesh vibrational sensor can be used to predict mechanical failure. In another TinyMesh atmospheric sensors can be used to predict mechanical failure. In a third mesh, temperature sensors can be used to predict an electronic failure. The system can include an alerting system or a dashboard that can send out alerts based on outcome from one or more TinyMesh.

User Interface for Deploying TinyContainers

Figure 22:
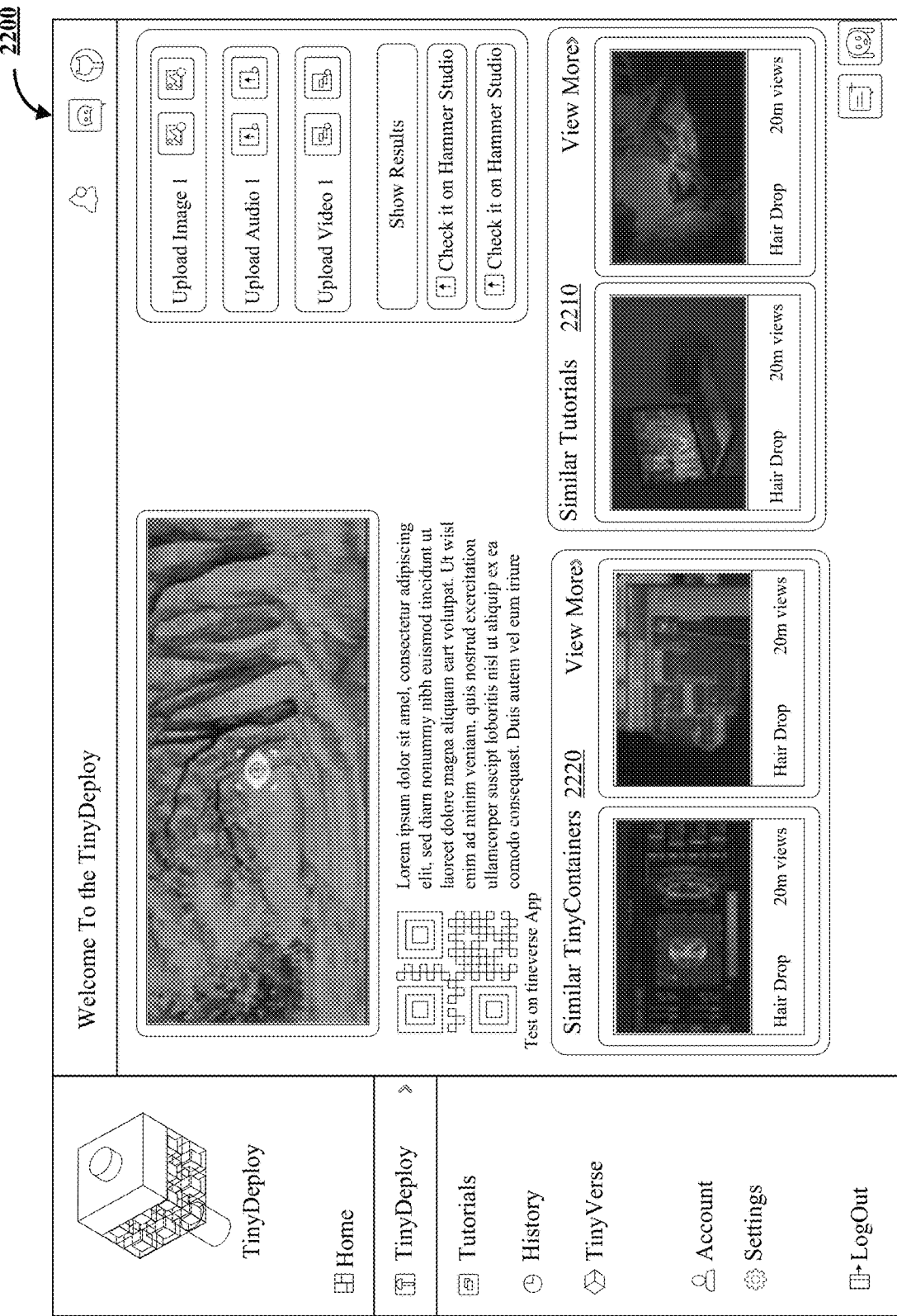

FIGS. 22 to 28 present user interface examples for TinyDeploy tool. The user interface examples illustrate management and development of TinyContainers for deployment to Tiny ML hardware or other types of edge devices. FIG. 22 presents an example user interface 2200 that can be considered as a landing page or a starting page for a user or a developer who wants to build or deploy an already built TinyContainer to a target Tiny ML hardware device. The TinyDeploy tool provides tutorials 2210 to users for building and deploying TinyContainers. The TinyDeploy tool can also recommend (2220) already built TinyContainers to the user for viewing. In one implementation, the system includes logic to recommend tutorials and pre-built TinyContainers that are similar to a user's development history or similar to TinyContainers previously built by the user.

Figure 23:
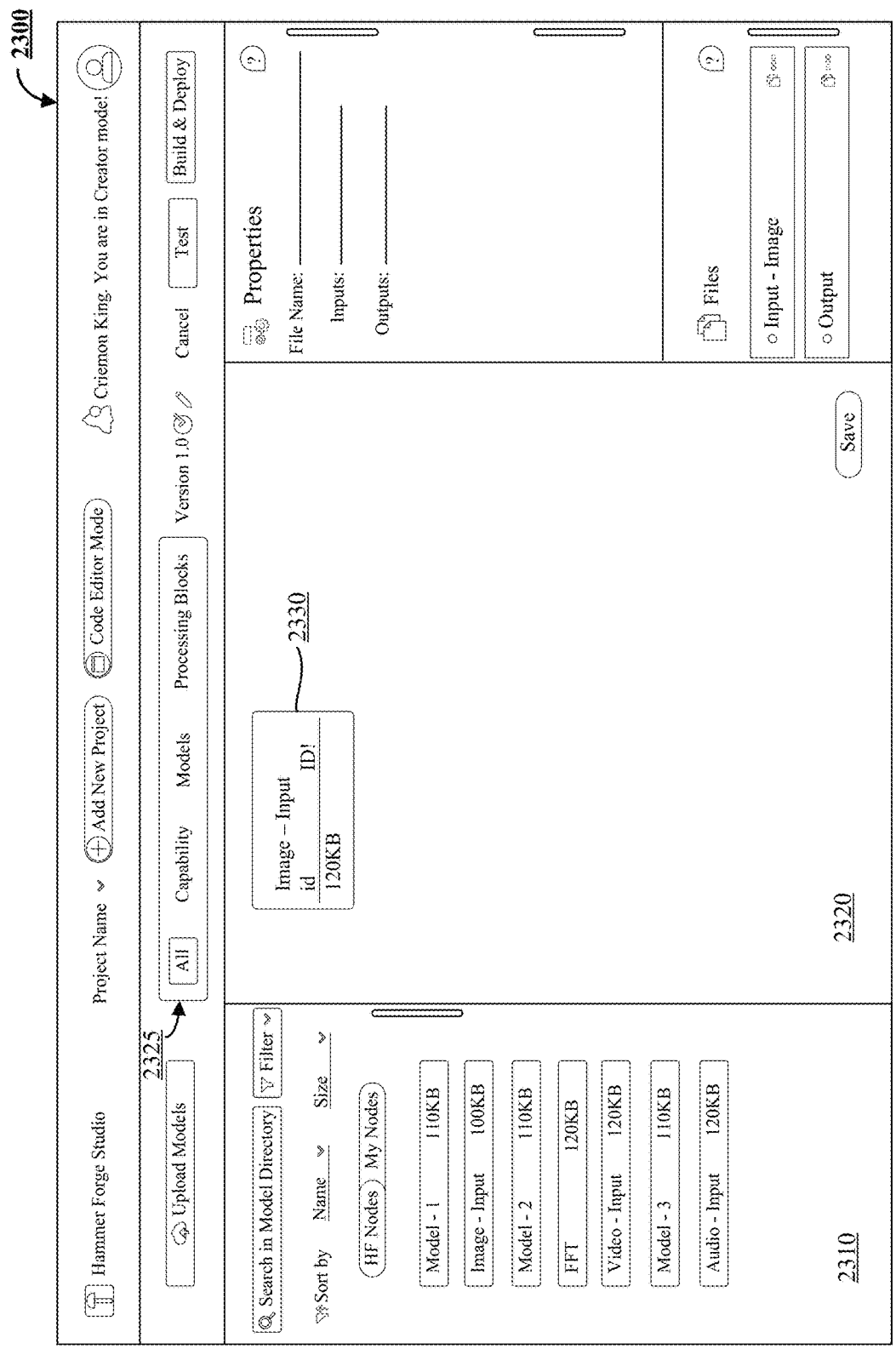

FIG. 23 presents an example development environment 2300 that can be provided by TinyDeploy tool to build TinyContainers by selecting pre-built modules. Some pre-built modules available to the user are presented in a side-bar 2310. The TinyDeploy tool can provide modules for "Capability", "Models", or "Processing Blocks, etc. A menu bar 2325 allows a user to select the type of pre-built modules to display in the side-bar for selection. A user can select a pre-built module and place in the development region 2320. The modules can then be connected using connectors to build a TinyContainer. In FIG. 23, a user has selected "Image-Input" module (2330) as a capability.

Figure 24:
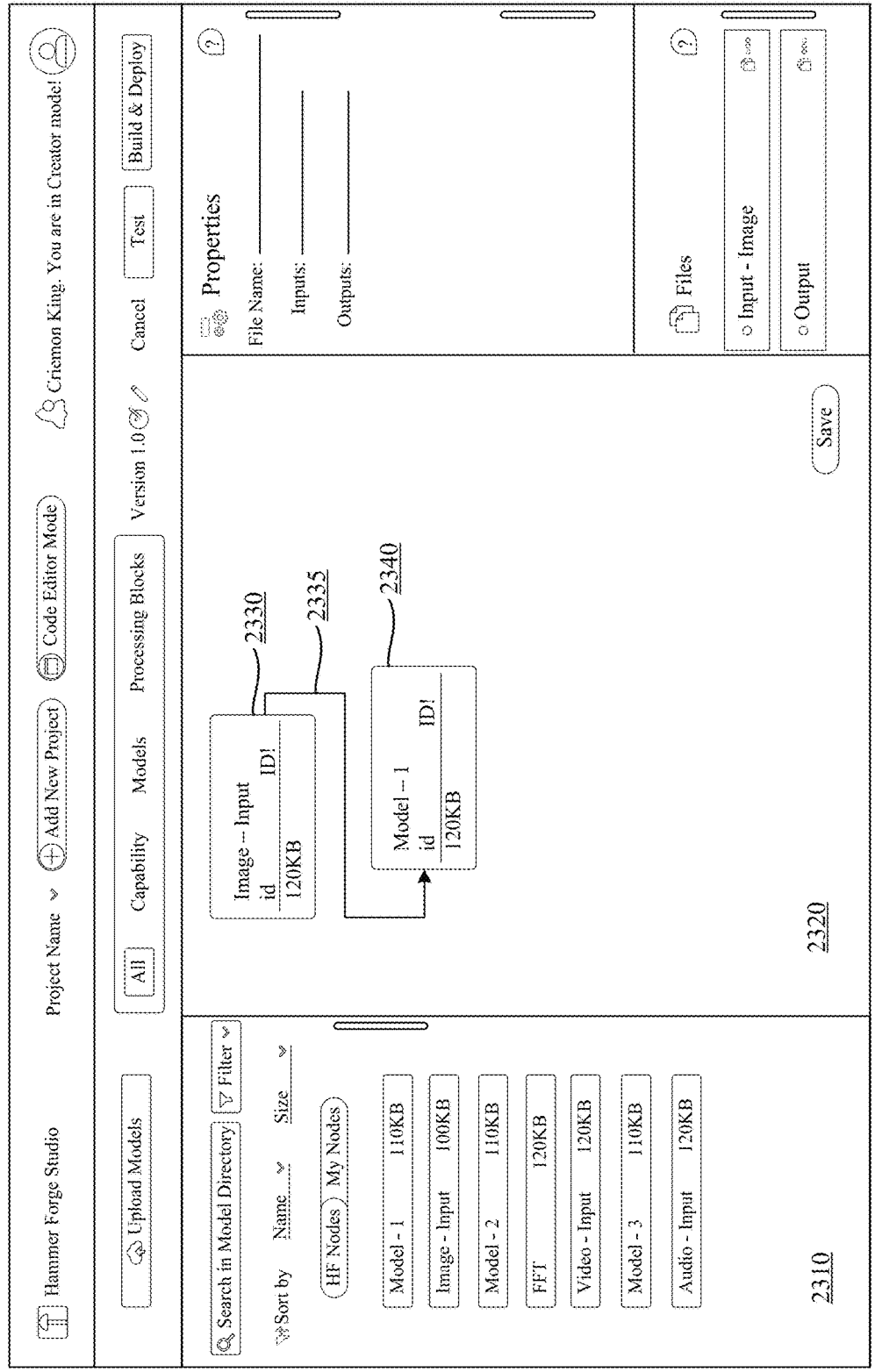

FIG. 24 continues the TinyContainer building example from FIG. 23. In FIG. 24, the user selects a "Model-1" module 2340 which is a module implementing a machine learning model. The user drags the module from the side-bar 2310 and drops it into the development area 2320. The user can then use a pointing device to make a connection between modules 2330 and 2340. A connector 2335 indicates the connection between the two modules. An arrow on the connector 2335 indicates the direction of flow of data. In this case, the image data is provided as input to the model.

Figure 25:
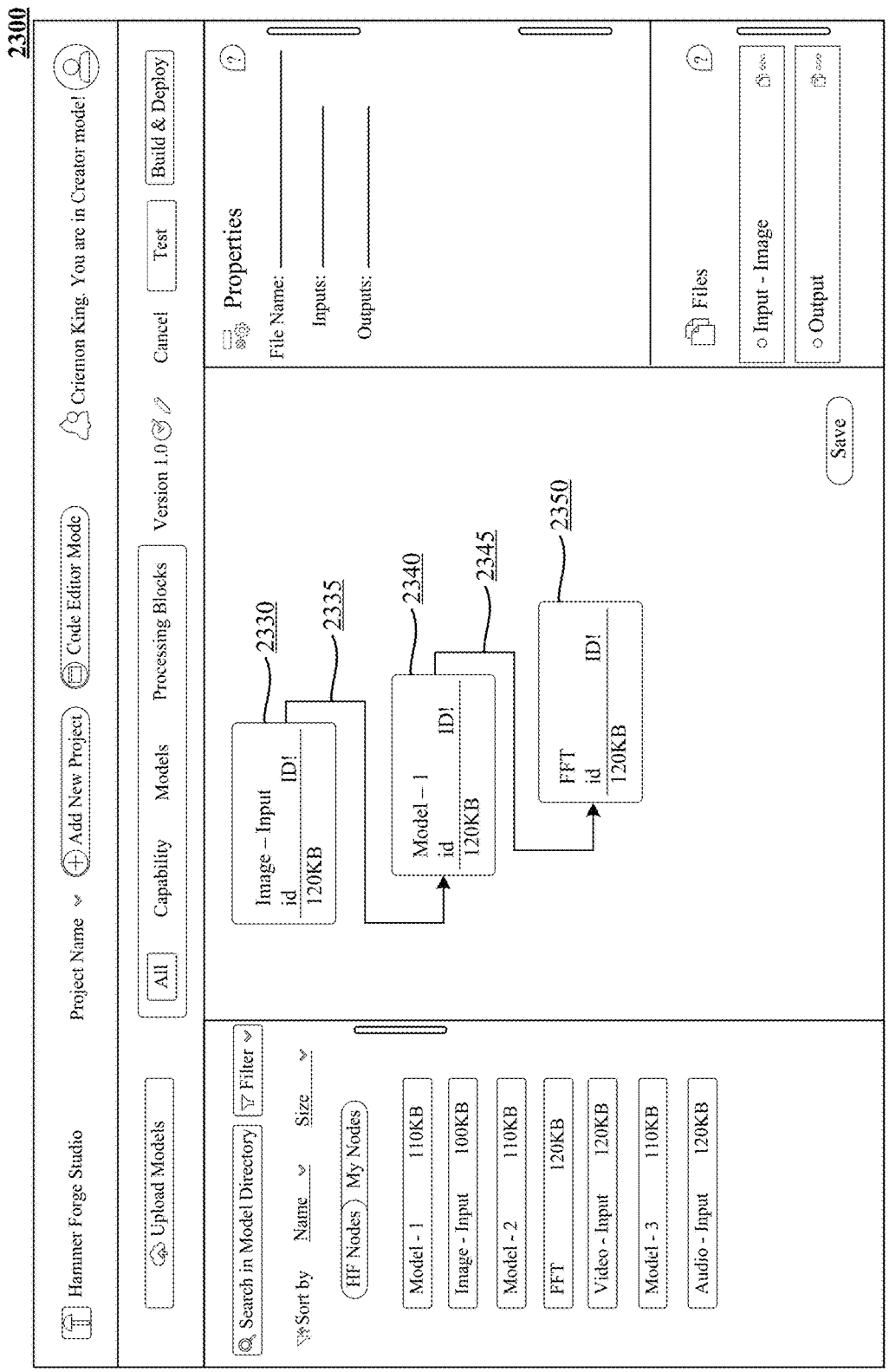

FIG. 25 shows a data processing block module "FFT" (2350) connected to the output from the model module 2340. A connector 2345 connects the model module to the processing block module 2350. The processing block is also added to the TinyContainer by a user by dragging and dropping the processing block from the side-bar to the development area of the tool.

Figure 26:
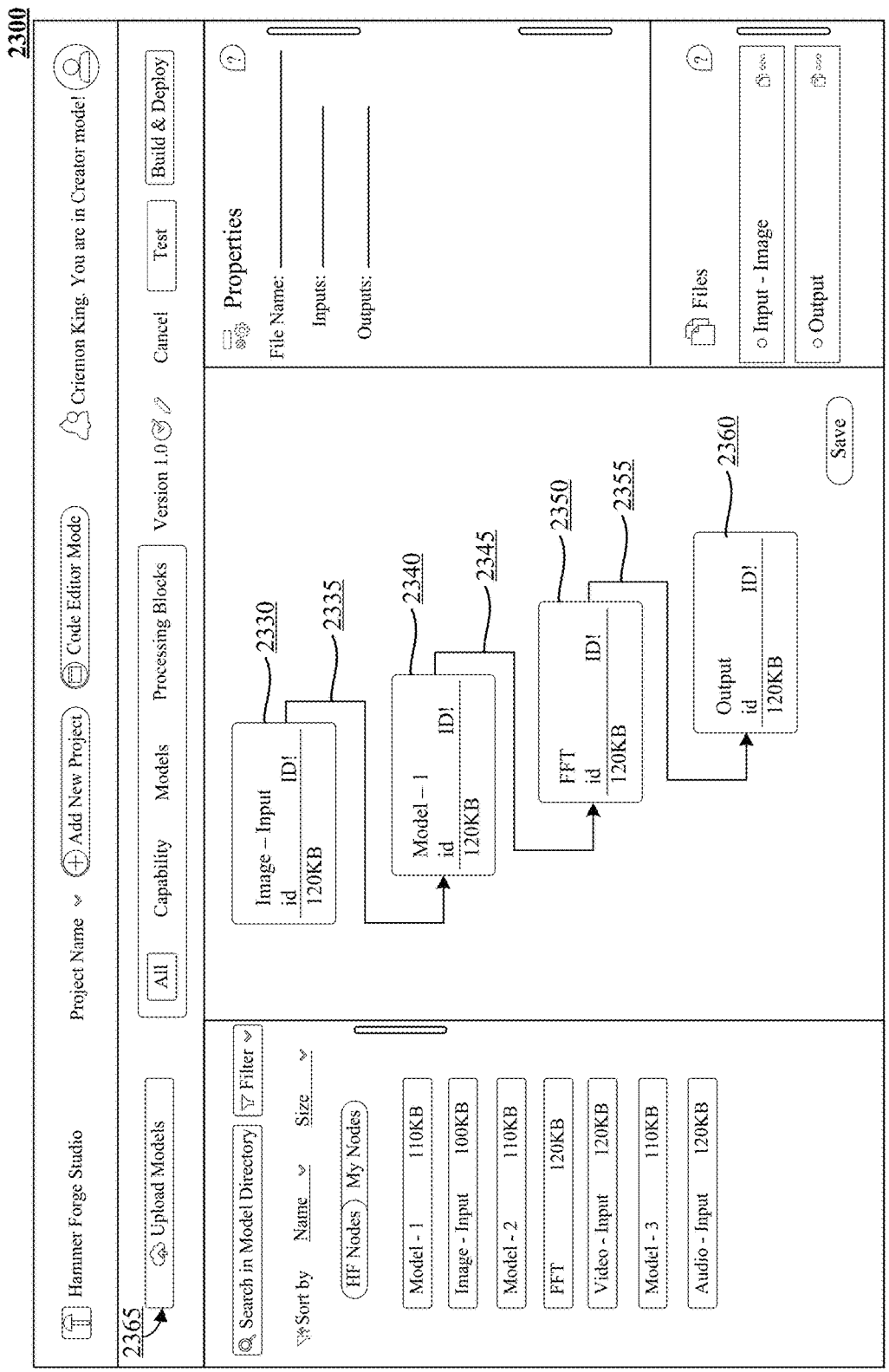

FIG. 26 shows an output module 2360 connected to the output from the processing block module 2350. The user can drag and drop the output module from the side-bar to the development area and use a connector 2355 to connect the processing block 2350 to output module 2360. FIG. 26 shows a complete TinyContainer built by the user by selecting pre-built modules provided by the TinyDeploy tool. The system also allows users to upload their models to the TinyDeploy tool using "Upload Models" user interface element (2365).

FIG. 27 presents an example user interface 2700 including a list of TinyContainers available for deployment. For each TinyContainer, the system lists a project name, a date when the TinyContainer was added or built, a type of the TinyContainer and provides options to users to perform various actions such as edit or delete the TinyContainer. The type of TinyContainer can indicate a user to select an appropriate TinyContainer. Examples of types as listed in FIG. 27 include image processing, video processing, natural language processing (NLP), etc.

Figure 28:
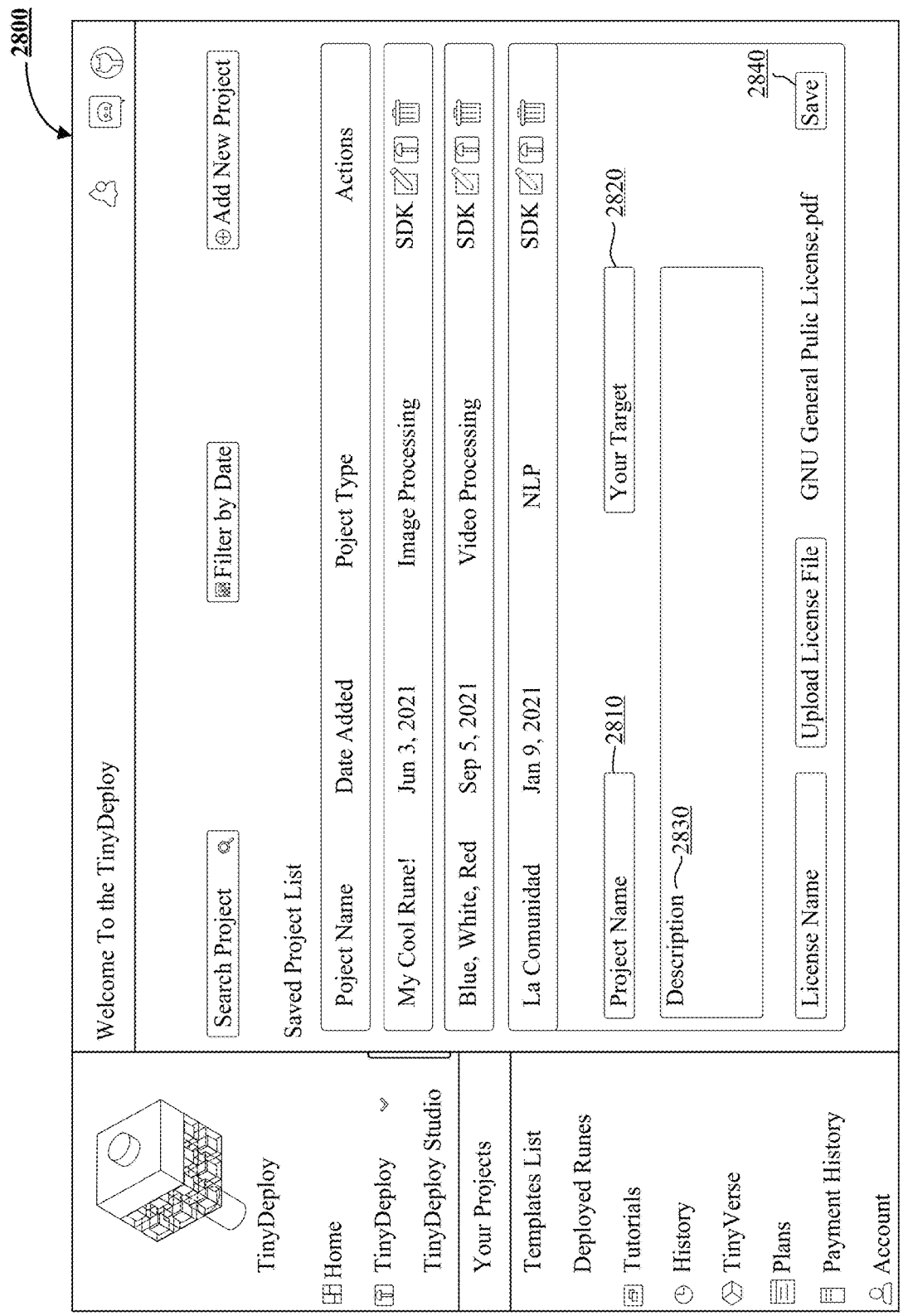

FIG. 28 shows a TinyContainer project selected by a user from the list of TinyContainer projects displayed on the TinyDeploy tool user interface (2800). The selected project's edit screen is shown in FIG. 28. The user can edit the project name (2810), description (2830), target device (2820), etc. The user can also upload a license file. Once the edits are complete, the user can save edits using a Save button (2840).

Clauses

A technology is described for various implementations of a system for preparing cross-platform applications for deployment to tiny ML hardware. Alternatively, the technology disclosed can deploy cross-platform applications to tiny sensor hardware.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:

Clause Set 1

1. A method of cross-platform programming of tiny machine learning (ML) applications, including:
   providing a first declarative instruction that, when processed, interacts with a cross-platform capability of tiny ML hardware;
   providing a second declarative instruction that, when processed, invokes at least one ML procedure block that interacts with the capability to provide input to a tiny ML model to run on an instance of tiny ML hardware;
   providing a third declarative instruction that, when processed, causes output from the tiny ML hardware;
   compiling the ML procedure block and the tiny ML model into bytecode that interacts, via a virtual machine (VM) layer, with the capability to produce the output responsive to the first, second and third declarative instructions; and
   executing the bytecode on the tiny ML hardware or a simulation of the tiny ML hardware and causing the bytecode to process the declarative instructions without recompilation of the bytecode to adapt to alternative instances of the tiny ML hardware, each running its alternative virtual machine (VM) layer.

2. The method of clause 1, wherein the cross-platform capability includes generating a random number.

3. The method of clause 2, wherein the tiny ML hardware accepts parameters and generates the random number.

4. The method of clause 1, wherein the cross-platform capability of tiny ML hardware captures an image.

5. The method of clause 1, wherein the cross-platform capability of tiny ML hardware captures an audio sample.

6. The method of clause 1, wherein the cross-platform capability of tiny ML hardware captures vibration data.

7. The method of clause 1, wherein the ML procedure block transforms input captured by the capability of the tiny ML hardware to produce input for the tiny ML model.

8. A system including one or more processors coupled to memory, the memory loaded with computer instructions to perform cross-platform programming of tiny machine learning (ML) applications, the instructions, when executed on the processors, implement actions comprising:
   providing a first declarative instruction that, when processed, interacts with a cross-platform capability of tiny ML hardware;
   providing a second declarative instruction that, when processed, invokes at least one ML procedure block that interacts with the capability to provide input to a tiny ML model to run on an instance of tiny ML hardware;
   providing a third declarative instruction that, when processed, causes output from the tiny ML hardware;
   compiling the ML procedure block and the tiny ML model into bytecode that interacts, via a virtual machine (VM) layer, with the capability to produce the output responsive to the first, second and third declarative instructions; and
   executing the bytecode on the tiny ML hardware or a simulation of the tiny ML hardware and causing the bytecode to process the declarative instructions without recompilation of the bytecode to adapt to alternative instances of the tiny ML hardware, each running its alternative virtual machine (VM) layer.

9. The system of clause 8, wherein the cross-platform capability includes generating a random number.

10. The system of clause 9, wherein the tiny ML hardware accepts parameters and generates the random number.

11. The system of clause 8, wherein the cross-platform capability of tiny ML hardware captures an image.

12. A non-transitory computer readable storage medium impressed with computer program instructions to perform cross-platform programming of tiny machine learning (ML) applications, the instructions, when executed on a processor, implement a method comprising:
   providing a first declarative instruction that, when processed, interacts with a cross-platform capability of tiny ML hardware;
   providing a second declarative instruction that, when processed, invokes at least one ML procedure block that interacts with the capability to provide input to a tiny ML model to run on an instance of tiny ML hardware;
providing a third declarative instruction that, when processed, causes output from the tiny ML hardware;
compiling the ML procedure block and the tiny ML model into bytecode that interacts, via a virtual machine (VM) layer, with the capability to produce the output responsive to the first, second and third declarative instructions; and
executing the bytecode on the tiny ML hardware or a simulation of the tiny ML hardware and causing the bytecode to process the declarative instructions without recompilation of the bytecode to adapt to alternative instances of the tiny ML hardware, each running its alternative virtual machine (VM) layer.

13. The non-transitory computer readable storage medium of clause 12, wherein the cross-platform capability of tiny ML hardware captures an image.

14. The non-transitory computer readable storage medium of clause 12, wherein the cross-platform capability of tiny ML hardware captures an audio sample.

15. A system for preparing cross-platform applications for deployment to tiny ML hardware, comprising:
a cloud-based system providing tools to maintain:
definition of a first declarative instruction that, when processed, interacts with cross-platform capabilities common to multiple tiny ML hardware instances;
definition of a second declarative instruction that, when processed, invoke at least one procedure block that interacts with the capabilities to produce input to a tiny ML model that runs on the tiny ML hardware;
definition of a third declarative instruction that, when processed, causes output from the tiny ML hardware;
the system providing a compiler to compile the procedure block and the tiny ML model into bytecode, wherein the compiled bytecode:
interacts via a virtual machine (VM) layer, with at least one capability to produce the output responsive to the first, second and third declarative instructions; and
executes on the tiny ML hardware or a tiny ML hardware simulator without recompilation of the bytecode to adapt to alternative instances of the tiny ML hardware, each running its alternative virtual machine (VM) layer.

16. The system of clause 15, further comprising, logic to host, update and maintain the cloud-based system by a third party separate and distinct from a first party that develops the tiny ML models.

17. The system of clause 15, wherein the cross-platform capability includes generating a random number.

18. The system of clause 15, the cross-platform capability captures an image.

19. The system of clause 15, wherein the cross-platform capability captures an audio sample.

20. The system of clause 15, wherein the procedure block transforms input captured by the capability of the tiny ML hardware to produce input for the tiny ML model.

21. A method of cross-platform programming of tiny sensor applications, including:
providing a declarative instruction to a capability of sensor hardware;
providing a declarative instruction to at least one procedure block that interacts with the capability and with a sensor processing model to run on a sensor hardware;
providing a declarative instruction to output from the sensor hardware;
compiling the sensor processing model to bytecode that interacts with the capability, the procedure block, and the output using a cross platform interaction with the declarative instructions; and
running the bytecode on the sensor hardware or a simulation of the sensor hardware and causing the bytecode to interact with the declarative instructions without recompilation of the bytecode to adapt to a particular instance of the sensor hardware.

Clause Set 2

1. A system for deploying cross-platform applications to tiny ML hardware; comprising:
a system providing tools to maintain:
definition of a first declarative instruction that when processed, interacts with cross-platform capabilities common to multiple tiny ML hardware instances,
definition of a second declarative instruction that, when processed, invoke at least one procedure block that interacts with the capabilities to produce input to a tiny ML model that runs on the tiny ML hardware,
definition of a third declarative instruction that when processed, causes output from the tiny ML hardware,
compiled bytecode for the procedure block and the tiny ML model that runs on the tiny ML hardware,
the compiled bytecode further including a manifest of one or more capabilities, one or more procedure blocks and at least one output supported by the tiny ML model; and
the system providing a loader that:
connects to an instance of the tiny ML hardware,
verifies presence of tinySupport infrastructure running on the tiny ML hardware,
verifies availability that the instance of the ML hardware supports the one or more capabilities, the one or more procedure blocks and the at least one output specified in the manifest,
loads the bytecode and verifies integrity of the load.

2. The system of clause 1, further comprising logic to host, update and maintain, the system, by a third party separate and distinct from a first party that develops the tiny ML model.

3. The system of clause 1, wherein the cross-platform capability includes generating a random number.

4. The system of clause 3, wherein the tiny ML hardware accepts parameters and generates the random number.

5. The system of clause 1, wherein the cross-platform capability captures an image.

6. The system of clause 1, wherein the cross-platform capability captures an audio sample.

7. The system of clause 1, wherein the cross-platform capability captures vibration data.

8. The system of clause 1, wherein the procedure block transforms input captured by the capability of the tiny ML hardware to produce input for the tiny ML model.

9. The system of clause 1, wherein the loader further comprising logic to:
detect tiny ML hardware devices available for loading the bytecode, and
display a list of available tiny ML hardware devices on a user interface.

10. The system of clause 1, wherein the loader further comprises logic to collect operational log data from the tiny ML hardware.

11. A method of deploying cross-platform applications to tiny ML hardware, including:
  maintaining definition of a first declarative instruction that when processed, interacts with cross-platform capabilities common to multiple tiny ML hardware instances,
  maintaining definition of a second declarative instruction that, when processed, invokes at least one procedure block that interacts with the capabilities to produce input to a tiny ML model that runs on the tiny ML hardware,
  maintaining definition of a third declarative instruction that when processed, causes output from the tiny ML hardware,
  compiling bytecode for the procedure block and the tiny ML model that runs on the tiny ML hardware,
    wherein the compiled bytecode further including a manifest of one or more capabilities, one or more procedure blocks and at least one output supported by the tiny ML model; and
    connecting to an instance of the tiny ML hardware,
  verifying presence of tinySupport infrastructure running on the tiny ML hardware,
  verifying availability that the instance of the ML hardware supports the one or more capabilities, the one or more procedure blocks and the at least one output specified in the manifest,
  loading the bytecode and verifying integrity of the load.
12. The method of clause 11, wherein the cross-platform capability includes generating a random number.
13. The method of clause 12, wherein the tiny ML hardware accepts parameters and generates the random number.
14. The method of clause 11, wherein the cross-platform capability captures an image.
15. The method of clause 11, further including:
  detecting tiny ML hardware devices available for loading the bytecode, and
  displaying a list of available tiny ML hardware devices on a user interface.
16. A non-transitory computer readable storage medium impressed with computer program instructions to deploy cross-platform applications to tiny ML hardware, the instructions, when executed on a processor, implement a method comprising:
  maintaining definition of a first declarative instruction that when processed, interacts with cross-platform capabilities common to multiple tiny ML hardware instances,
  maintaining definition of a second declarative instruction that, when processed, invokes at least one procedure block that interacts with the capabilities to produce input to a tiny ML model that runs on the tiny ML hardware,
  maintaining definition of a third declarative instruction that when processed, causes output from the tiny ML hardware,
  compiling bytecode for the procedure block and the tiny ML model that runs on the tiny ML hardware,
    wherein the compiled bytecode further including a manifest of one or more capabilities, one or more procedure blocks and at least one output supported by the tiny ML model;
  connecting to an instance of the tiny ML hardware,
  verifying presence of tinySupport infrastructure running on the tiny ML hardware,
  verifying availability that the instance of the ML hardware supports the one or more capabilities, the one or more procedure blocks and the at least one output specified in the manifest, and
  loading the bytecode and verifying integrity of the load.
17. The non-transitory computer readable storage medium of clause 16, wherein the cross-platform capability includes generating a random number.
18. The non-transitory computer readable storage medium of clause 17, wherein the tiny ML hardware accepts parameters and generates the random number.
19. The non-transitory computer readable storage medium of clause 16, wherein the cross-platform capability captures an image.
20. A system for deploying cross-platform applications to sensor hardware; comprising:
  a system providing tools to maintain:
    definition of a first declarative instruction that when processed, interacts with cross-platform capabilities common to multiple sensor hardware instances,
    definition of a second declarative instruction that, when processed, invoke at least one procedure block that interacts with the capabilities to produce input to a sensor processing model that runs on the sensor hardware,
    definition of a third declarative instruction that when processed, causes output from the sensor hardware,
    compiled bytecode for the procedure block and the sensor processing model that runs on the sensor hardware,
    the compiled bytecode further including a manifest of one or more capabilities, one or more procedure blocks and at least one output supported by the sensor processing model; and
  the system providing a loader that:
    connects to an instance of the sensor hardware,
    verifies presence of tinySupport infrastructure running on the sensor hardware,
    verifies availability that the instance of the sensor hardware supports the one or more capabilities, the one or more procedure blocks and the at least one output specified in the manifest,
    loads the bytecode and verifies integrity of the load.
21. A system for preparing cross-platform applications for deployment to sensor hardware, comprising:
  a cloud-based system providing tools to maintain:
    definitions of declarative instructions to capabilities common to multiple sensor hardware instances;
    definitions of declarative instructions to procedure blocks that interact with the capabilities and with sensor processing models that run on the sensor hardware;
    definitions of declarative instructions to output by the sensor hardware;
  the system providing a compiler to compile a sensor processing model to bytecode, wherein the compiled bytecode:
    interacts with at least one capability, at least one procedure block, and at least one output using the declarative instructions; and
    runs on the sensor hardware or a sensor hardware simulator without recompilation of the bytecode to adapt to a particular instance of the sensor hardware.
22. The system of clause 21, further comprising, logic to host, update and maintain the cloud-based system by a third party separate and distinct from a first party that develops the sensor processing models.
Clause Set 3
1. A system for deploying cross-platform applications to multiple heterogenous instances of tiny ML hardware; comprising:

a system providing tools to maintain:
  compiled bytecode for a tiny ML model that runs on the tiny ML hardware without recompilation of the bytecode to adapt to a particular instance of the tiny ML hardware, further including a manifest of one or more capabilities, one or more procedure blocks and at least one output on which the tiny ML model depends;
  definitions or scripts for loading the compiled bytecode onto the multiple heterogenous instances of tiny ML hardware;
the system providing a loader that:
  connects to the multiple heterogenous instances of tiny ML hardware that are interconnected when operating;
  verifies presence of tinySupport infrastructure running on each of the ML hardware instances;
  verifies availability to each of the ML hardware instances of the capabilities, procedure blocks and output specified in the manifest;
  loads the bytecode and verifies integrity of the load on each of the ML hardware instances.
2. The system of clause 1, further comprising logic to host, update and maintain, the system, by a third party separate and distinct from a first party that develops the tiny ML model.

Computer System

Figure 21:
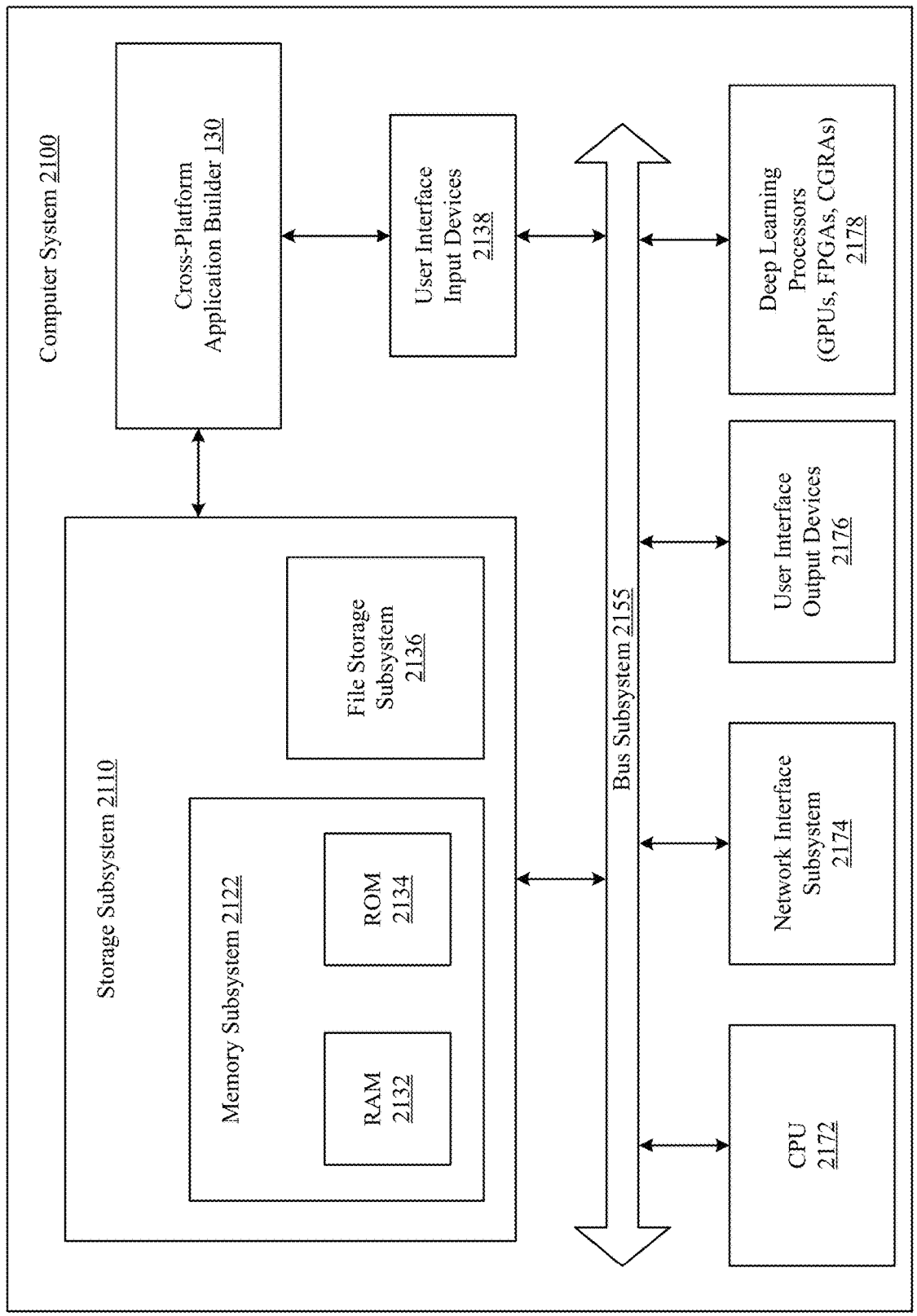
FIG. 21 is a block diagram of a computer system that can be used to implement the technology disclosed.

A computer-implemented method implementation of the technology disclosed includes Computer System 2100 as shown in FIG. 21.

FIG. 21 is a simplified block diagram of a computer system 2100 that can be used to implement the technology disclosed. Computer system 2100 includes at least one central processing unit (CPU) 2172 that communicates with a number of peripheral devices via bus subsystem 2155. These peripheral devices can include a storage subsystem 2110 including, for example, memory devices and a file storage subsystem 2136, user interface input devices 2138, user interface output devices 2176, and a network interface subsystem 2174. The input and output devices allow user interaction with computer system 2100. Network interface subsystem 2174 provides an interface to outside networks, including an interface to corresponding interface devices in other computer systems.

In one implementation, the cross-platform application builder 130 is communicably linked to the storage subsystem 2110 and the user interface input devices 2138. The cross-platform application deployer 140 can also be communicably linked to the storage subsystem 2110 and the user interface input devices 2138.

User interface input devices 2138 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2100.

User interface output devices 2176 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2100 to the user or to another machine or computer system.

Storage subsystem 2110 stores programming and data constructs that provide the functionality of some or all of the modules and methods described herein. Subsystem 2178 can be graphics processing units (GPUs) or field-programmable gate arrays (FPGAs).

Memory subsystem 2122 used in the storage subsystem 2110 can include a number of memories including a main random access memory (RAM) 2132 for storage of instructions and data during program execution and a read only memory (ROM) 2134 in which fixed instructions are stored. A file storage subsystem 2136 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2136 in the storage subsystem 2110, or in other machines accessible by the processor.

Bus subsystem 2155 provides a mechanism for letting the various components and subsystems of computer system 2100 to communicate with each other as intended. Although bus subsystem 2155 is shown schematically as a single bus, alternative implementations of the bus subsystem can use multiple busses.

Computer system 2100 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2100 depicted in FIG. 21 is intended only as a specific example for purposes of illustrating the preferred embodiments of the present invention. Many other configurations of computer system 2100 are possible having more or less components than the computer system depicted in FIG. 21.

The computer system 2100 includes GPUs or FPGAs 2178. It can also include machine learning processors hosted by machine learning cloud platforms such as Google Cloud Platform, Xilinx, and Cirrascale. Examples of deep learning processors include Google's Tensor Processing Unit (TPU), rackmount solutions like GX4 Rackmount Series, GX8 Rackmount Series, NVIDIA DGX-1, Microsoft' Stratix V FPGA, Graphcore's Intelligence Processing Unit (IPU), Qualcomm's Zeroth platform with Snapdragon processors, NVIDIA's Volta, NVIDIA's DRIVE PX, NVIDIA's JETSON TX1/TX2 MODULE, Intel's Nirvana, Movidius VPU, Fujitsu DPI, ARM's DynamicIQ, IBM TrueNorth, and others.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

We claim as follows:
1. A method of deploying cross-platform applications to tiny ML hardware, including:
  maintaining definition of a first declarative instruction that when processed, interacts with cross-platform capabilities common to multiple tiny ML hardware instances, maintaining definition of a second declarative instruction that, when processed, invokes at least one procedure block that interacts with the capabilities to produce input to a tiny ML model that runs on the tiny ML hardware, maintaining definition of a third declarative instruction that when processed, causes output from the tiny ML hardware, compiling bytecode for the procedure block and the tiny ML model that runs on the tiny ML hardware, wherein the compiled bytecode further including a manifest of one or more capabilities, one or more procedure blocks and at least one output supported by the tiny ML model; and connecting to an instance of the tiny ML hardware, verifying presence of tinySupport infrastructure running on the tiny ML hardware, verifying availability that the instance of the ML hardware supports the one or more capabilities, the one or more procedure blocks and the at least one output specified in the manifest, and loading the bytecode and verifying integrity of the load.

2. The method of claim 1, wherein the cross-platform capability includes generating a random number.

3. The method of claim 2, wherein the tiny ML hardware accepts parameters and generates the random number.

4. The method of claim 1, wherein the cross-platform capability captures an image.

5. The method of claim 1, further including:

detecting tiny ML hardware devices available for loading the bytecode, and displaying a list of available tiny ML hardware devices on a user interface.

6. The method of claim 1, further including hosting, updating and maintaining the cross-platform applications, by a third party separate and distinct from a first party that develops the tiny ML model.

7. The method of claim 1, wherein the cross-platform capability captures an audio sample.

8. The method of claim 1, wherein the cross-platform capability captures vibration data.

9. The method of claim 1, further including using the procedure block to transform input captured by the capability of the tiny ML hardware to produce input for the tiny ML model.

10. The method of claim 1, wherein the loading the bytecode includes collecting operational log data from the tiny ML hardware.

11. A non-transitory computer readable storage medium impressed with computer program instructions to deploy cross-platform applications to tiny ML hardware, the instructions, when executed on a processor, implement a method comprising:

maintaining definition of a first declarative instruction that when processed, interacts with cross-platform capabilities common to multiple tiny ML hardware instances, maintaining definition of a second declarative instruction that, when processed, invokes at least one procedure block that interacts with the capabilities to produce input to a tiny ML model that runs on the tiny ML hardware, maintaining definition of a third declarative instruction that when processed, causes output from the tiny ML hardware, compiling bytecode for the procedure block and the tiny ML model that runs on the tiny ML hardware, wherein the compiled bytecode further including a manifest of one or more capabilities, one or more procedure blocks and at least one output supported by the tiny ML model; and connecting to an instance of the tiny ML hardware, verifying presence of tinySupport infrastructure running on the tiny ML hardware, verifying availability that the instance of the ML hardware supports the one or more capabilities, the one or more procedure blocks and the at least one output specified in the manifest, and loading the bytecode and verifying integrity of the load.

12. The non-transitory computer readable storage medium of claim 11, wherein the cross-platform capability includes generating a random number.

13. The non-transitory computer readable storage medium of claim 12, wherein the tiny ML hardware accepts parameters and generates the random number.

14. The non-transitory computer readable storage medium of claim 11, wherein the cross-platform capability captures an image.

15. The non-transitory computer readable storage medium of claim 11, the implementing the method further comprising:

hosting, updating and maintaining, the cross-platform applications, by a third party separate and distinct from a first party that develops the tiny ML model.

16. The non-transitory computer readable storage medium of claim 11, wherein the cross-platform capability captures an audio sample.

17. The non-transitory computer readable storage medium of claim 11, wherein the cross-platform capability captures vibration data.

18. The non-transitory computer readable storage medium of claim 11, the implementing the method further comprising:

using the procedure block to transform input captured by the capability of the tiny ML hardware to produce input for the tiny ML model.

19. The non-transitory computer readable storage medium of claim 11, the implementing the method further comprising:

detecting tiny ML hardware devices available for loading the bytecode, and displaying a list of available tiny ML hardware devices on a user interface.

20. The non-transitory computer readable storage medium of claim 11, wherein the loading the bytecode includes collecting operational log data from the tiny ML hardware.

\* \* \* \* \*